US012355354B2

United States Patent
Oshita et al.

(10) Patent No.: US 12,355,354 B2
(45) Date of Patent: Jul. 8, 2025

(54) SWITCHING POWER SUPPLY CIRCUIT AND SWITCHING POWER SUPPLY DEVICE

(71) Applicant: Rohm Co., Ltd., Kyoto (JP)

(72) Inventors: Hiroto Oshita, Kyoto (JP); Takatsugu Wachi, Kyoto (JP); Yosuke Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 244 days.

(21) Appl. No.: 18/319,811

(22) Filed: May 18, 2023

(65) Prior Publication Data
US 2023/0412077 A1 Dec. 21, 2023

(30) Foreign Application Priority Data

Jun. 20, 2022 (JP) .............................. JP2022-098520

(51) Int. Cl.
*H02M 3/158* (2006.01)
*H02M 1/00* (2006.01)
*H02M 1/088* (2006.01)

(52) U.S. Cl.
CPC ......... *H02M 3/158* (2013.01); *H02M 1/0054* (2021.05); *H02M 1/088* (2013.01)

(58) Field of Classification Search
CPC .... H02M 3/158; H02M 1/0054; H02M 1/088; H02M 1/36
See application file for complete search history.

(56) References Cited

U.S. PATENT DOCUMENTS 8,582,259 B2 * 11/2013 Murakami ............ H02M 3/156
361/56
10,892,681 B2 * 1/2021 Fukushima ............. H02M 1/08

FOREIGN PATENT DOCUMENTS

JP 2020-089043 6/2020

* cited by examiner

*Primary Examiner* — Adolf D Berhane
*Assistant Examiner* — Afework S Demisse
(74) *Attorney, Agent, or Firm* — Fish & Richardson P.C.

(57) ABSTRACT

A switching power supply circuit includes: a switching circuit switching an input voltage; a first amplifier generating a first voltage; a first phase compensation circuit including a first capacitor and compensating for a phase of the first voltage; a second amplifier generating a second voltage; a second phase compensation circuit including a second capacitor and compensating for a phase of the second voltage; and a drive control circuit executing a switching operation according to the second voltage, wherein the switching power supply circuit operates in a first or second mode, the drive control circuit performs, in the first mode, the switching operation, and stops, in the second mode, the switching operation, and when returning from the second mode to the first mode, a specific voltage corresponding to an output voltage is supplied to the second capacitor and a predetermined voltage is supplied to the first capacitor.

9 Claims, 15 Drawing Sheets

When Vin = 10 V (output duty: 50%)

When Vin = 20 V (output duty: 25%)

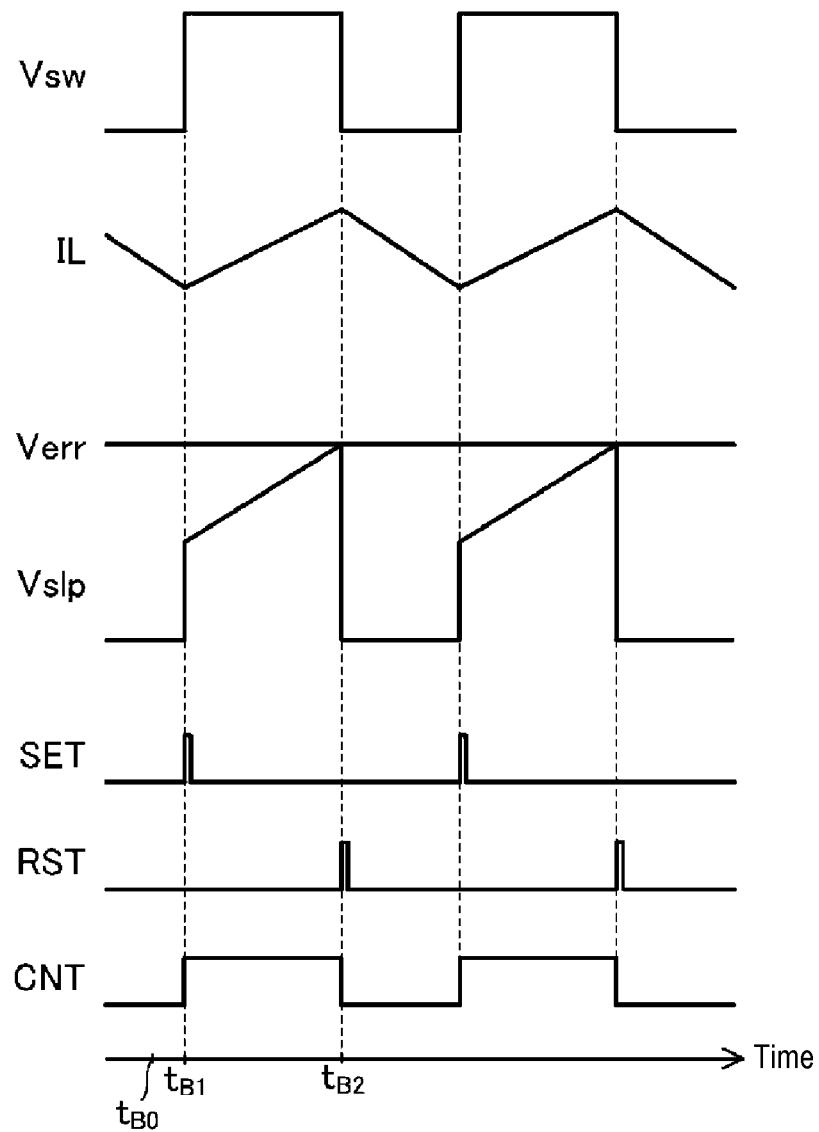

SWITCHING POWER SUPPLY CIRCUIT AND SWITCHING POWER SUPPLY DEVICE

CROSS-REFERENCE TO RELATED APPLICATION

This application is based upon and claims the benefit of priority from Japanese Patent Application No. 2022-098520, filed on Jun. 20, 2022, the entire contents of which are incorporated herein by reference.

TECHNICAL FIELD

The present disclosure relates to a switching power supply circuit and a switching power supply device.

BACKGROUND

A switching power supply device generates a desired output voltage by switching an input voltage through a switching operation.

In the switching power supply device, when power consumption of a load becomes sufficiently small, it is possible to shift to a mode in which a switching operation is stopped. As a result, efficiency is improved through reduction in switching loss. When the power consumption of the load increases, the mode in which the switching operation is stopped is returned to a mode in which the switching operation is performed. However, at this time, an output voltage may become unstable immediately after the return.

SUMMARY

Some embodiments of the present disclosure provide a switching power supply circuit and a switching power supply device, which contribute to stabilization of an output voltage relating to resumption of a switching operation.

According to an embodiment of the present disclosure, a switching power supply circuit used in a switching power supply device configured to generate an output voltage by switching an input voltage, includes: a switching circuit configured to switch the input voltage by a switching operation; a first amplifier configured to generate, on a first wiring, a first voltage corresponding to a first difference between a feedback voltage corresponding to the output voltage and a reference voltage; a first phase compensation circuit including a first capacitor provided in series between the first wiring and a fixed potential point and configured to compensate for a phase of the first voltage; a second amplifier configured to generate, on a second wiring, a second voltage corresponding to a second difference between a voltage corresponding to a current flowing through the switching circuit and the first voltage; a second phase compensation circuit including a second capacitor provided in series between the second wiring and the fixed potential point and configured to compensate for a phase of the second voltage; and a drive control circuit configured to be capable of executing the switching operation according to the second voltage, wherein the switching power supply circuit is configured to operate in a first mode or a second mode according to the feedback voltage, wherein the drive control circuit is configured to, in the first mode, perform the switching operation while driving the first amplifier and the second amplifier, and in the second mode, stop the switching operation by stopping driving the first amplifier and the second amplifier, and when returning from the second mode to the first mode, a specific voltage corresponding to the output voltage is supplied to the second capacitor and a predetermined voltage is supplied to the first capacitor.

BRIEF DESCRIPTION OF DRAWINGS

The accompanying drawings, which are incorporated in and constitute a part of the specification, illustrate embodiments of the present disclosure.

FIG. 21 is a relationship diagram of a plurality of signals according to the second embodiment of the present disclosure.

FIG. 22 is an operation explanation diagram of the power supply IC according to the second embodiment of the present disclosure.

DETAILED DESCRIPTION

Figure 1:
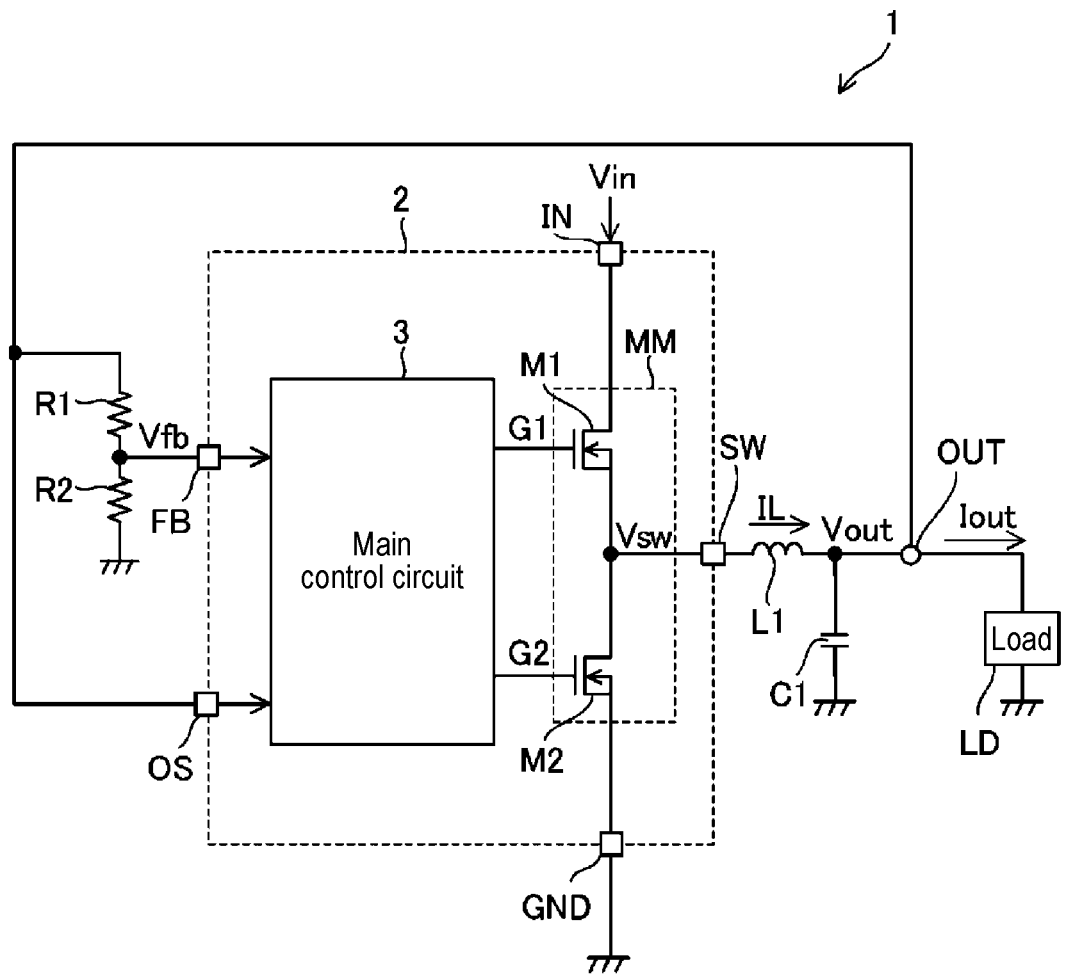
FIG. 1 is an overall configuration diagram of a switching power supply device according to a first embodiment of the present disclosure.

Hereinafter, examples of embodiments of the present disclosure will be specifically described with reference to the drawings. In each figure referred to, the same parts are denoted by like reference numerals, and redundant descriptions of the same parts are omitted in principle. In the present disclosure, for the sake of simplification of description, by describing symbols or codes that refer to information, signals, physical quantities, functional parts, circuits, elements, components, or the like, names of information, signals, physical quantities, functional parts, circuits, elements, components, or the like corresponding to the pertinent symbols or codes may be omitted or abbreviated. For example, a light load detection comparator (see FIG. 3) referred to by "22" described later may be denoted as a light load detection comparator 22 or abbreviated as a comparator 22. However, they refer to the same component.

First, an explanation will be provided for some terms used in describing embodiments of the present disclosure. The term "IC" is an abbreviation for an integrated circuit. The term "ground" refers to a reference conductive portion with a potential of 0 V (zero volts) as a reference, or refers to a potential of 0 V itself. The reference conductive portion may be formed by using a conductor such as metal or the like. A potential of 0 V is sometimes referred to as a ground potential. In embodiments of the present disclosure, voltages indicated without specific reference represent potentials with respect to ground.

The term "level" refers to a level of a potential. For any signal or voltage of interest, a high level has a higher potential than a low level. For any signal or voltage of interest, an expression that the signal or voltage is at a high level means, strictly speaking, that the level of the signal or voltage is at a high level, and an expression that the signal or voltage is at a low level means, strictly speaking, that the level of the signal or voltage is at a low level. A level for a signal is sometimes referred to as a signal level, and a level for a voltage is sometimes referred to as a voltage level.

For any signal or voltage of interest, switching from a low level to a high level is called an up-edge, and a timing of switching from a low level to a high level is called an up-edge timing. The up-edge may be synonymous with a rising edge. Similarly, for any signal or voltage of interest, switching from a high level to a low level is called a down-edge, and a timing of switching from a high level to a low level is called a down-edge timing. The down-edge may be synonymous with a falling edge.

For any transistor formed as a FET (Field Effect Transistor) including a MOSFET, the term "on state" refers to a state in which a drain and a source of the transistor are electrically connected, and the term "off state" refers to a state (disconnected state) in which the drain and source of the transistor are not electrically connected. The same applies to transistors that are not classified as FETs. A MOSFET is understood to be an enhancement type MOSFET unless otherwise stated. The MOSFET is an abbreviation for a "metal-oxide-semiconductor field-effect transistor." Moreover, it may be considered that a back gate is short-circuited to a source in any MOSFET unless otherwise specified.

An arbitrary switch may include one or more FETs (Field Effect Transistors). When a certain switch is in an on state, the two ends of the switch are electrically connected. When a certain switch is in an off state, the two ends of the switch are not electrically connected.

Hereinafter, the on state and off state of any transistor or switch may be simply expressed as on and off. For any transistor or switch, switching from an off state to an on state is expressed as being turned on, and switching from an on state to an off state is expressed as being turned off. Further, for any transistor or switch, a period during which a transistor or a switch is in an on state is sometimes referred to as an on period, and a period during which a transistor or a switch is in an off state is sometimes referred to as an off period.

For any signal that takes a high level or a low level as a signal level, a period during which the level of the signal is at the high level is called a high level period, and a period during which the level of the signal is at the low level is called a low level period. The same applies to any voltage that takes a high level or a low level as a voltage level.

A connection among a plurality of components forming a circuit, such as arbitrary circuit elements, wirings, and nodes, may be understood to refer to an electrical connection unless otherwise specified.

First Embodiment

A first embodiment of the present disclosure will be described. FIG. 1 is an overall configuration diagram of a switching power supply device 1 according to the first embodiment of the present disclosure. The switching power supply device 1 of FIG. 1 includes a power supply IC 2 which is a switching power supply circuit (switching power supply semiconductor device), and a plurality of discrete components externally connected to the power supply IC 2. The discrete components include a capacitor C1 as an output capacitor, resistors R1 and R2 as feedback resistors, and a coil L1. The switching power supply device 1 is configured as a step-down switching power supply device (DC/DC converter) that generates a desired output voltage Vout from an externally supplied input voltage Vin. An output voltage Vout is generated at the output terminal OUT. That is, the output terminal OUT is an application terminal of the output voltage Vout (a terminal to which the output voltage Vout is applied). The output voltage Vout is supplied to a load LD connected to the output terminal OUT.

The input voltage Vin and the output voltage Vout are positive DC voltages, and the output voltage Vout is lower than the input voltage Vin. For example, when the input voltage Vin is 12 V, the output voltage Vout may be stabilized at a desired positive voltage value (e.g., 3.3 V or 5 V) below 12 V by adjusting the resistance values of the resistors R1 and R2. A current flowing through the load LD via the output terminal OUT is referred to as an output current Iout.

Figure 2:
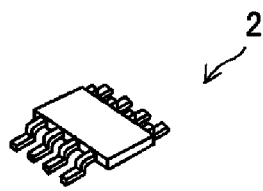
FIG. 2 is an external perspective view of a power supply IC according to the first embodiment of the present disclosure.

FIG. 2 is an external perspective view of the power supply IC 2. The power supply IC 2 is an electronic component that includes a semiconductor chip including a semiconductor integrated circuit formed on a semiconductor substrate, a housing (package) accommodating the semiconductor chip, and a plurality of external terminals exposed from the housing to the outside of the power supply IC 2. The power supply IC 2 is formed by encapsulating the semiconductor chip in the housing (package) made of a resin. The number of external terminals of the power supply IC 2 and the type of housing of the power supply IC 2 shown in FIG. 2 are merely examples, and may be designed arbitrarily. A switching circuit MM and a main control block (or a main control circuit) 3 shown in FIG. 1 are included in the semiconductor integrated circuit.

In FIG. 1, only an input terminal IN, a switch terminal SW, a feedback terminal FB, an output monitoring terminal OS, and a ground terminal GND are shown as some of the plurality of external terminals provided in the power supply IC 2 (the same applies to FIG. 3 and the like described later). However, other external terminals (e.g., an enable terminal, a power good terminal, and a boot terminal) are also provided in the power supply IC 2.

An external configuration of the power supply IC 2 will be described. An input voltage Vin is supplied to the input terminal IN from outside of the power supply IC 2. A coil L1 is interposed in series between the switch terminal SW and the output terminal OUT. That is, one end of the coil L1 is connected to the switch terminal SW, and the other end of the coil L1 is connected to the output terminal OUT. Further, the output terminal OUT is connected to the ground via a capacitor C1. Further, the output terminal OUT is connected to one end of the resistor R1, and the other end of the resistor R1 is grounded via the resistor R2. A connection node between the resistors R1 and R2 is connected to the feedback terminal FB. In addition, the output monitoring terminal OS is connected to the output terminal OUT. Therefore, the output voltage Vout is applied to the output monitoring terminal OS. The ground terminal GND is connected to the ground. A current flowing through the coil L1 is referred to as a coil current IL.

An internal configuration of the power supply IC 2 will be described. The power supply IC 2 includes a switching circuit MM and a main control block 3 configured to control the switching circuit MM.

The switching circuit MM includes transistors M1 and M2 configured as N-channel MOSFETs (Metal Oxide Semiconductor Field Effect Transistors). The transistors M1 and M2 are a pair of switching elements connected in series between the input terminal IN and the ground terminal GND (i.e., the ground). By switching and driving the transistors M1 and M2, the input voltage Vin is switched, and a rectangular-wave switch voltage Vsw appears at the switch terminal SW. The transistor M1 is provided at the high side and the transistor M2 is provided at the low side. Specifically, a drain of the transistor M1 is connected to the input terminal IN, which is the terminal to which the input voltage Vin is applied, and a source of the transistor M1 and a drain of the transistor M2 are commonly connected to the switch terminal SW. The source of transistor M2 is connected to the ground. A resistor for current detection may be inserted between a source of the transistor M2 and the ground.

The transistor M1 functions as an output transistor, and the transistor M2 functions as a synchronous rectification transistor. The coil L1 and the capacitor C1 constitute a rectifying/smoothing circuit that rectifies and smoothes the rectangular-wave switch voltage Vsw appearing at the switch terminal SW to generate the output voltage Vout. The resistors R1 and R2 form a voltage dividing circuit that divides the output voltage Vout. A feedback voltage Vfb, which is a divided voltage of the output voltage Vout, is generated at a connection node between the resistors R1 and R2. The feedback voltage Vfb is inputted to the feedback terminal FB by connecting the connection node between the resistors R1 and R2 to the feedback terminal FB.

Gate signals G1 and G2 are supplied as drive signals to the gates of the transistors M1 and M2, respectively. The transistors M1 and M2 are turned on and off in response to the gate signals G1 and G2. When the gate signal G1 is at a high level, the transistor M1 is turned on, and when the gate signal G1 is at a low level, the transistor M1 is turned off. Similarly, when the gate signal G2 is at a high level, the transistor M2 is turned on, and when the gate signal G2 is at a low level, the transistor M2 is turned off. Basically, the transistors M1 and M2 are alternately turned on and off, but both of the transistors M1 and M2 may remain off. That is, the state of the switching circuit MM is one of an output high state, an output low state, and a Hi-Z state. In the output high state, the transistors M1 and M2 are turned on and off, respectively. In the output low state, the transistors M1 and M2 are turned off and on, respectively. In the Hi-Z state, the transistors M1 and M2 are both turned off. There is no situation that both the transistors M1 and M2 are turned on.

The main control block 3 controls the on/off states of the transistors M1 and M2 through controlling the level of the gate signals G1 and G2 based on the feedback voltage Vfb, thereby generating an output voltage Vout corresponding to the feedback voltage Vfb at the output terminal OUT. Further, as shown in FIG. 1, the main control block 3 may be supplied with the output voltage Vout. The main control block 3 may perform overvoltage protection and the like based on the output voltage Vout, and may also set a below-described clamp voltage by using the output voltage Vout (the details of which will be described later).

Although not shown, the power supply IC 2 is provided with an internal power supply circuit that generates an internal power supply voltage based on the input voltage Vin. Each circuit in the main control block 3 is driven based on the internal power supply voltage. The gate signal G2 is a signal based on the ground potential, while the gate signal G1 is a signal based on the potential of the switch terminal SW. The low-level gate signal G1 has the potential of the switch terminal SW, and the high-level gate signal G1 is higher than the potential of the switch terminal SW by a predetermined voltage. The predetermined voltage referred to here is higher than a gate threshold voltage of the transistor M1. In the related art, a bootstrap circuit (not shown) may be used to generate a boosted power supply for generating the gate signal G1.

Further, although it is assumed here that a synchronous rectification method is used, a diode rectification method may be used in the switching circuit MM. When the diode rectification method is employed, the transistor M2 is removed from the switching circuit MM. Instead, the switching circuit MM is provided with a synchronous rectification diode (not shown) whose anode is connected to the ground and whose cathode is connected to the switch terminal SW.

Figure 3:
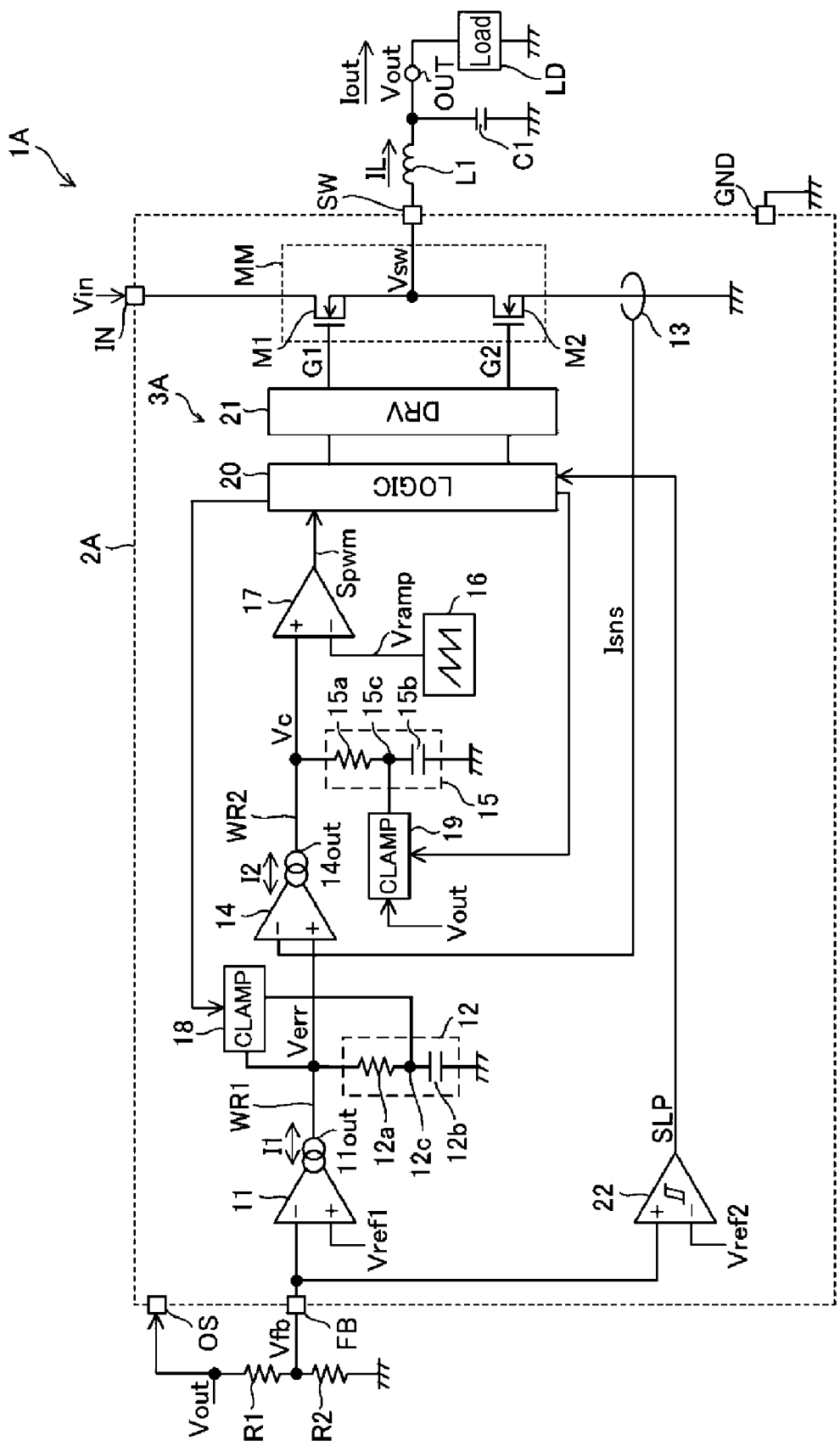
FIG. 3 is an internal configuration diagram of the power supply IC according to the first embodiment of the present disclosure.

FIG. 3 shows a configuration of a switching power supply device 1A as an example of the switching power supply device 1. A power supply IC 2A is provided as the power supply IC 2 in the switching power supply device 1A. The power supply IC 2A is provided with a switching circuit MM and a main control block 3A as the main control block 3. All of the above-described matters regarding the switching power supply device 1, the power supply IC 2, and the main control block 3 also apply to the switching power supply device 1A, the power supply IC 2A, and the main control block 3A unless contradictory.

The main control block 3A includes an error amplifier 11, a phase compensation circuit 12, a current sensor 13, a differential amplifier 14, a phase compensation circuit 15, a ramp voltage generation circuit 16, a comparator (PWM comparator) 17, a clamp circuit 18, a clamp circuit 19, a logic circuit 20, a driver 21, and a light load detection comparator 22.

The error amplifier 11 is a current output type transconductance amplifier. The error amplifier 11 includes an inverting input terminal, a non-inverting input terminal, and an output terminal. The output terminal of the error amplifier 11 is specifically referred to by a symbol "11out." The output terminal 11out is connected to a wiring WR1. The inverting input terminal of the error amplifier 11 is connected to the feedback terminal FB to receive supply of the feedback voltage Vfb. A predetermined reference voltage Vref1 is supplied to the non-inverting input terminal of the error amplifier 11. The reference voltage Vref1 and the reference voltage Vref2, which will be described later, are DC voltages having a predetermined positive voltage value, and are generated by a reference voltage generation circuit (not shown) in the power supply IC 2A.

The error amplifier 11 outputs a current signal I1 corresponding to the difference between the feedback voltage Vfb and the reference voltage Vref1 from the output terminal 11out, such that an error voltage Verr corresponding to the difference between the feedback voltage Vfb and the reference voltage Vref1 is generated in the wiring WR1. Charges due to the current signal I1 are inputted/outputted to/from the wiring WR1. Specifically, when the feedback voltage Vfb is lower than the reference voltage Vref1, a current corresponding to the current signal I1 is outputted from the error amplifier 11 toward the wiring WR1 such that the potential of the wiring WR1 rises. When the feedback voltage Vfb is higher than the reference voltage Vref1, a current corresponding to the current signal I1 is inputted from the wiring WR1 toward the error amplifier 11 such that the potential of the wiring WR1 falls. As an absolute value of a difference between the feedback voltage Vfb and the reference voltage Vref1 increases, a magnitude of the current corresponding to the current signal I1 also increases.

A soft-start voltage that gradually increases from 0 V to a voltage exceeding the reference voltage Vref1 may be generated in the power supply IC 2A when the power supply IC 2A is started. In this case, the error amplifier 11 compares the lower one of the reference voltage Vref1 and the soft start voltage with the feedback voltage Vfb and generates the current signal I1 based on the comparison result. However, in the present embodiment, a state after the soft-start voltage becomes higher than the reference voltage Vref1 is taken into consideration. The presence of the soft-start voltage is ignored below (the same applies to other embodiments described later).

The phase compensation circuit 12 is provided between the wiring WR1 and the ground to receive the input of the current signal I1 and compensate the phase of the error voltage Verr. The phase compensation circuit 12 includes a series circuit of a resistor 12a and a capacitor 12b. Specifically, one end of the resistor 12a is connected to the wiring WR1, and the other end of the resistor 12a is connected to one end of the capacitor 12b at a node 12c. The other end of the capacitor 12b is connected to the ground. By appropriately setting the resistance value of the resistor 12a and the capacitance value of the capacitor 12b, the phase of the error voltage Verr may be compensated to prevent oscillation of an output feedback loop.

The current sensor 13 samples a coil current IL flowing through the coil L1 at a predetermined timing and outputs a current detection signal Isns indicating a value corresponding to the sampled coil current IL. The current detection signal Isns is a voltage signal, and therefore the voltage represented by the current detection signal Isns may be referred to as a voltage Isns. It is assumed that an electrical polarity of the coil current IL directed from the switch terminal SW to the output terminal OUT is positive, and an electrical polarity of the coil current IL directed from the output terminal OUT to the switch terminal SW is negative. The voltage Isns rises as the coil current IL goes from the negative side to the positive side. Therefore, when the coil current IL is positive, the voltage Isns increases as the magnitude of the coil current IL increases, and when the coil current IL is negative, the voltage Isns decreases as the magnitude of the coil current IL increases. For example, the current sensor 13 includes a sense resistor provided between the source of the transistor M2 and the ground, and generates the voltage Isns by sampling a voltage drop across the sense resistor while the transistor M2 is turned on. That is, the coil current IL may be detected by detecting the current flowing through the transistor M2. However, the current sensor 13 may generate the voltage Isns by detecting the current flowing through the transistor M1 or directly detecting the current flowing through the coil L1.

Like the error amplifier 11, the differential amplifier 14 is also a current output type transconductance amplifier. The differential amplifier 14 has an inverting input terminal, a non-inverting input terminal, and an output terminal. The output terminal of the differential amplifier 14 is specifically referred to by a symbol "14out." The output terminal 14out is connected to a wiring WR2. The non-inverting input terminal of the differential amplifier 14 is connected to the wiring WR1 to receive the error voltage Verr. The inverting input terminal of the differential amplifier 14 is supplied with the voltage Isns.

The differential amplifier 14 outputs a current signal I2 corresponding to the difference between the error voltage Verr and the voltage Isns from the output terminal 14out, thereby generating a comparison voltage Vc corresponding to the difference between the error voltage Verr and the voltage Isns at the wiring WR2. Charges due to the current signal I2 are inputted/outputted to/from the wiring WR2. Specifically, when the error voltage Verr is higher than the voltage Isns, a current corresponding to the current signal I2 is outputted from the differential amplifier 14 toward the wiring WR2 such that the potential of the wiring WR2 rises. When the error voltage Verr is lower than the voltage Isns, a current corresponding to the current signal I2 is inputted from the wiring WR2 toward the differential amplifier 14 such that the potential of the wiring WR2 falls. As the absolute value of the difference between error voltage Verr and voltage Isns increases, the magnitude of the current corresponding to the current signal I2 also increases.

The phase compensation circuit 15 is provided between the wiring WR2 and the ground to receive the input of the current signal I2 and compensate the phase of the comparison voltage Vc. The phase compensation circuit 15 includes a series circuit of a resistor 15a and a capacitor 15b. Specifically, one end of the resistor 15a is connected to the wiring WR2, and the other end of the resistor 15a is connected to one end of the capacitor 15b at a node 15c. The other end of the capacitor 15b is connected to the ground. By appropriately setting the resistance value of the resistor 15a and the capacitance value of the capacitor 15b, the phase of the comparison voltage Vc may be compensated to prevent oscillation of an output feedback loop.

Figure 4:
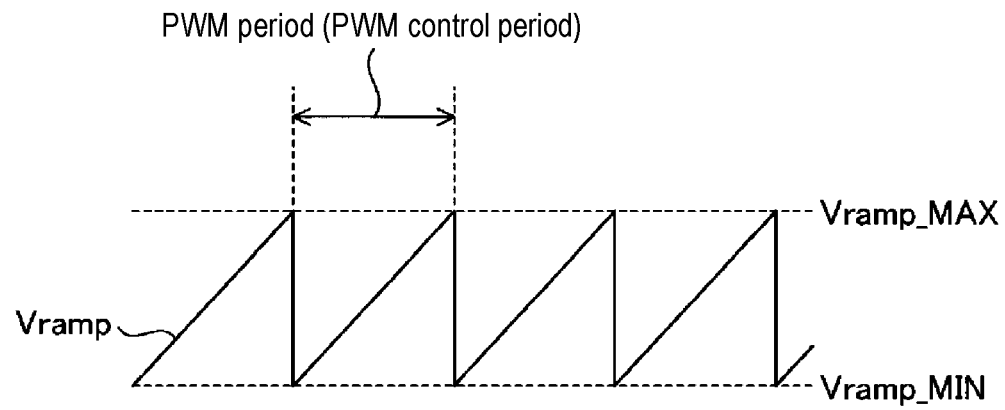
FIG. 4 is a waveform diagram of a ramp voltage according to the first embodiment of the present disclosure.

The ramp voltage generation circuit 16 generates a ramp voltage Vramp whose voltage value is changed periodically in a predetermined PWM period. The PWM period corresponds to a reciprocal of a PWM frequency, which will be described later. The ramp voltage Vramp has, for example, a triangular or sawtooth-shaped voltage waveform. It is assumed here that, as shown in FIG. 4, the value of the ramp voltage Vramp fluctuates between a predetermined lower limit voltage value Vramp_MIN and a predetermined upper limit voltage value Vramp_MAX. That is, a range from the lower limit voltage value Vramp_MIN to the upper limit voltage value Vramp_MAX is a fluctuation range (variable range) of the ramp voltage Vramp, and "Vramp_MAX>Vramp_MIN≥0." The period of fluctuation of the ramp voltage Vramp is the PWM period (i.e., the PWM control period). In each PWM period, the ramp voltage Vramp increases linearly and monotonically over time starting from the lower limit voltage value Vramp_MIN, and instantly returns to the lower limit voltage value Vramp_MIN when it reaches the upper limit voltage value Vramp_MAX.

The non-inverting input terminal of the comparator 17 is connected to the wiring WR2 to receive the comparison voltage Vc. A ramp voltage Vramp from the ramp voltage generation circuit 16 is supplied to the inverting input terminal of the comparator 17. The comparator 17 compares the comparison voltage Vc with the ramp voltage Vramp and outputs a signal Spwm, which is a pulse-width-modulated signal indicating the comparison result. The signal Spwm is at a high level during the period in which the comparison voltage Vc is higher than the ramp voltage Vramp, and is at a low level during the period in which the comparison voltage Vc is lower than the ramp voltage Vramp.

The clamp circuit 18 is connected to the wiring WR1. The clamp circuit 18 limits a variable range (upper and lower limits) of an error voltage Vcmp on the wiring WR1. A variable range of the coil current IL is limited by limiting the variable range of the error voltage Vcmp. The clamp circuit 18 is also connected to the node 12c. The clamp circuit 19 is also connected to the node 15c. Operations of the clamp circuits 18 and 19 are controlled by the logic circuit 20. The action of the clamp circuits 18 and 19 on the nodes 12c and 15c will be described later.

The logic circuit 20 controls the gate signals G1 and G2 by controlling the driver 21 based on the signal Spwm from the comparator 17. The driver 21 supplies the gate signals G1 and G2 based on the signal Spwm to the transistors M1 and M2 under the control of the logic circuit 20, thereby causing the switching circuit MM to perform a switching operation. In the switching operation, the transistors M1 and M2 are alternately turned on and off based on the signal Spwm. The error amplifier 11 generates the current signal I1 such that the feedback voltage Vfb and the reference voltage Vref1 are equal to each other. Therefore, through execution of the switching operation, the output voltage Vout is stabilized at a predetermined target voltage Vtg corresponding to the reference voltage Vref1 and a voltage division ratio by the resistors R1 and R2.

Figure 5:
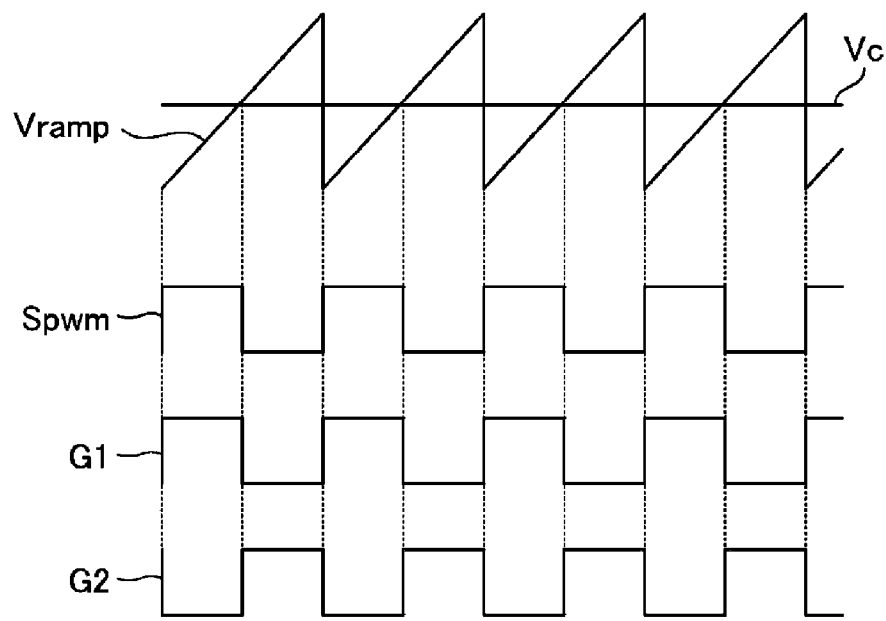
FIG. 5 is a waveform diagram of PWM control according to the first embodiment of the present disclosure.

As shown in FIG. 5, a high level period of the signal Spwm and a low level period of the signal Spwm are generated in each PWM period, and PWM control is performed at the PWM frequency. In PWM control, the switching circuit MM (transistors M1 and M2) is switched at the PWM frequency based on switching of a level relationship between the comparison voltage Vc and the ramp voltage Vramp. That is, in the PWM control, the transistors M1 and M2 are alternately turned on and off in the PWM period based on the signal Spwm.

More specifically, in the PWM control (in the switching operation under the PWM control), during the high level period of the signal Spwm, a high level gate signal G1 and a low level gate signal G2 are supplied to the gates of the transistors M1 and M2, respectively. As a result, the transistors M1 and M2 are turned on and off, respectively (that is, the switching circuit MM is put in a high output state). In the high output state, a current based on the input voltage Vin flows through the transistor M1 and the coil L1 toward the application terminal (OUT) of the output voltage Vout. Conversely, in the PWM control (in the switching operation under the PWM control), during the low level period of the signal Spwm, the low level gate signal G1 and the high level gate signal G2 are supplied to the gates of the transistors M1 and M2, respectively. As a result, the transistors M1 and M2 are turned off and on, respectively (that is, the switching circuit MM is put in a low output state). In the low output state, a current L1 based on a stored energy of the coil L1 flows through the transistor M2 and the coil L1. In order to reliably prevent generation of a through current, a dead time during which both of the transistors M1 and M2 are turned off may be inserted between the period in which the transistor M1 is turned on and the period in which the transistor M2 is turned on.

As described above, the switching power supply device 1A employs a current mode control method that performs output feedback control based on both the output voltage Vout and the coil current IL. A voltage Isns corresponding to the coil current IL is fed back to the differential amplifier 14. Under the action of the differential amplifier 14, when the error voltage Verr rises, the coil current IL increases, and when the error voltage Verr falls, the coil current IL decreases.

Although not shown specifically, the power supply IC 2A is provided with a reverse current detection circuit configured to detect a reverse current and an abnormality detection circuit configured to detect various abnormalities. The logic circuit 20 controls the gate signals G1 and G2 in consideration of the detection results of the reverse current detection circuit and the abnormality detection circuit. The reverse current refers to a current flowing from the switch terminal SW to the ground via the transistor M2. By comparing the switch voltage Vsw with the ground potential during the on period of the transistor M2, it is possible to detect the presence or absence of the reverse current. An SCP circuit, an OVP circuit, a UVLO circuit, a TSD circuit, and the like may be provided as the abnormality detection circuit. The SCP circuit detects whether the output terminal OUT is short-circuited to the ground based on the feedback voltage Vfb. The OVP circuit detects whether the output voltage Vout is in an overvoltage state based on the feedback voltage Vfb. The UVLO circuit detects the presence or absence of a low voltage abnormality in which the input voltage Vin is too low, based on the input voltage Vin. The TSD circuit detects the presence or absence of a temperature abnormality in the power supply IC 2A.

The light load detection comparator 22 is a comparator configured to detect a light load state. The light load state corresponds to a state in which the output current Tout is sufficiently small. The light load detection comparator 22 compares the feedback voltage Vfb inputted to its own non-inverting input terminal with the reference voltage Vref2 inputted to its own inverting input terminal, and outputs a control signal SLP (sleep control signal) indicating the comparison result. Hysteresis is set in this comparison. Starting from a state in which the feedback voltage Vfb is lower than the reference voltage Vref2 and the control signal SLP is at a low level, the comparator 22 outputs a high-level control signal SLP when the feedback voltage Vfb is higher than the reference voltage Vref2. Thereafter, when the feedback voltage Vfb becomes lower than the voltage (Vref2−ΔHYS2), the comparator 22 switches the level of the control signal SLP from a high level to a low level. The voltage (Vref2−ΔHYS2) refers to a voltage lower than the reference voltage Vref2 by a positive hysteresis voltage ΔHYS2.

The voltage (Vref2−ΔHYS2) may be higher than the reference voltage Vref1. Then, when the feedback voltage Vfb matches the reference voltage Vref1, the output voltage Vout is stabilized at a predetermined target voltage Vtg. Therefore, the control signal SLP is at a high level only when the output voltage Vout is reasonably above the target voltage Vtg. However, the reference voltage Vref1 and the voltage (Vref2−ΔHYS2) may match.

The control signal SLP is applied to the logic circuit 20. The logic circuit 20 may set an operation mode of the power supply IC 2A (hereinafter simply referred to as an operation mode) to a normal mode or a sleep mode based on the control signal SLP.

Figure 6:
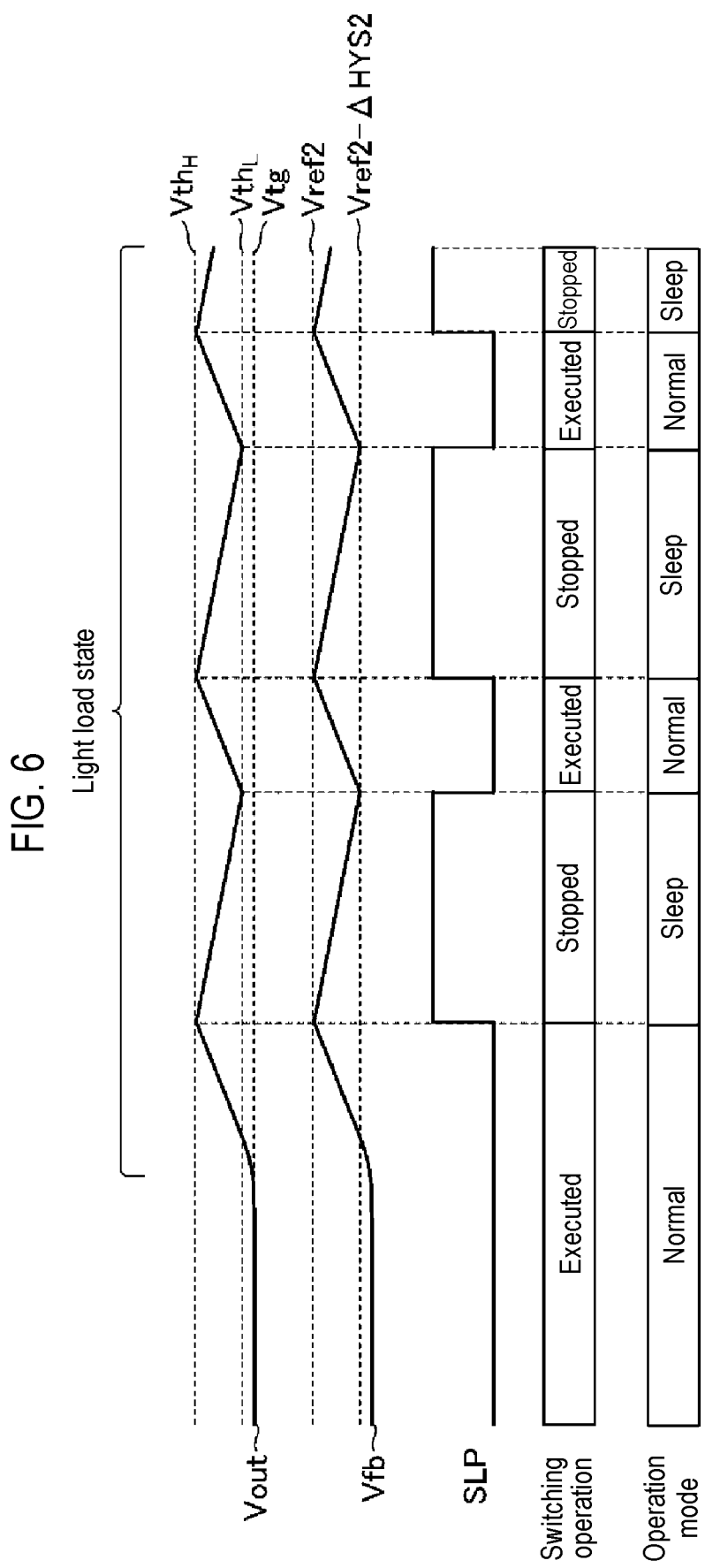
FIG. 6 is a diagram showing a change in operation mode and the like in a light load state according to the first embodiment of the present disclosure.

FIG. 6 shows an example of the relationship among the output voltage Vout, the control signal SLP, the switching operation, and the operation mode. It is assumed that the feedback voltage Vfb matches the reference voltage Vref2 when the output voltage Vout matches a predetermined voltage $Vth_H$, and the feedback voltage Vfb matches the voltage (Vref2−ΔHYS2) when the output voltage Vout matches a predetermined voltage $Vth_L$. Here, "$Vth_H > Vth_L > Vtg$." However, it may be set such that "$Vth_L = Vtg$."

The switching of the operation mode will be described starting from a state in which the output current Tout becomes sufficiently large after the output voltage Vout reaches the target voltage Vtg through the start-up of the power supply IC 2. The control signal SLP is at a low level in a stable state in which the output current Tout is sufficiently large and the output voltage Vout is stabilized at the target voltage Vtg. In the stable state, the logic circuit 20 sets the operation mode to the normal mode based on the low level control signal SLP. Each operation described above for each circuit in the power supply IC 2A is an operation when the operation mode is set to the normal mode. In the normal mode, the switching operation described above is performed based on the signal Spwm.

After shifting from the stable state to the light load state, when the switching operation is continued based on the low-level control signal SLP, the output voltage Vout rises above the target voltage Vtg and reaches the predetermined voltage $Vth_H$. At this time, an up-edge is generated in the control signal SLP. The logic circuit 20 switches the operation mode from the normal mode to the sleep mode at the up-edge of the control signal SLP. In the sleep mode, the logic circuit 20 performs sleep control (switching stop control) to stop the switching operation. Stopping the switching operation means that both of the transistors M1 and M2 are kept in an off state by maintaining both the gate signals G1 and G2 at a low level regardless of the signal Spwm.

Thereafter, when the output voltage Vout drops to be equal to or below the predetermined voltage $Vth_L$, a down-edge is generated in the control signal SLP. The logic circuit 20 switches the operation mode from the sleep mode to the normal mode at the down-edge of the control signal SLP. At this time, when the light load state is maintained, the switching operation is resumed in response to the switching to the normal mode, but the output voltage Vout reaches the predetermined voltage $Vth_H$ in a short period of time. As a result, while the light load state is maintained, the switching operation is repeatedly stopped and resumed, and the output voltage Vout generally reciprocates between the voltages $Vth_H$ and $Vth_L$. With such control, the switching operation is intermittently executed at light load, and the efficiency is improved through a reduction in a switching loss.

The logic circuit 20 may control driving or non-driving of each circuit in the main control block 3A. In the normal mode, the logic circuit 20 drives all circuits in the main control block 3A to realize switching operations according to the feedback voltage Vfb and the coil current IL. In the sleep mode, the logic circuit 20 preferably stops driving the current sensor 13, the ramp voltage generation circuit 16, and the comparator 17, thereby reducing power consumption. Further, in the sleep mode, the logic circuit 20 stops driving the error amplifier 11 and the differential amplifier 14, thereby further reducing power consumption.

That is, the logic circuit 20 performs the switching operation while driving the amplifiers 11 and 14 in the normal mode, and stops the switching operation along with stopping the driving of the amplifiers 11 and 14 in the sleep mode. However, when returning from the sleep mode to the normal mode, an output duty immediately after the return may become inappropriate unless some measures are taken, and it may take time to stabilize the output voltage Vout (at the target voltage Vtg). For example, in a case where the output duty immediately after the return is too low, the output voltage Vout may fall significantly below the target voltage Vtg immediately after the return. The output duty refers to a ratio of a length of the high output state period (i.e., a length of the high level period of the signal Spwm) to a length of the PWM period in each PWM period.

The power supply IC 2A adopts a technique that contributes to solving such a problem. The first embodiment of the present disclosure includes the following Examples EX1_1 to EX1_6. In each Example, a technique or a modified technique related to solving the above problem will be described. The matters described above in the first embodiment apply to the following Examples EX1_1 to EX1_6, unless otherwise stated and unless contradictory. However, in each Example, the description in each Example may take precedence over matters that conflict with the matters described in the first embodiment. In addition, as long as there is no contradiction, the matters described in any of Examples EX1_1 to EX1_6 may apply to any other Example (that is, any two or more Examples among the plurality of Examples may be combined).

Example EX1_1

Example EX1_1 will be described. An appropriate output duty differs according to the output voltage Vout. Meanwhile, the output duty depends on the comparison voltage Vc. Taking this into consideration, in Example EX1_1, when returning from the sleep mode to the normal mode, the voltage corresponding to the output voltage Vout is supplied from the clamp circuit 19 to the capacitor 15b.

Figure 7:
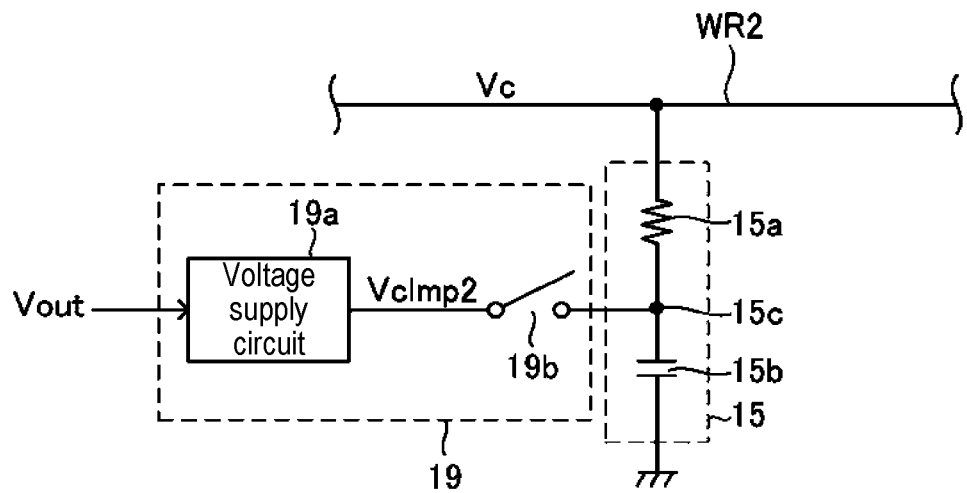
FIG. 7 is a diagram showing a configuration of a clamp circuit relating to a comparison voltage in an example EX1_1 according to the first embodiment of the present disclosure.

FIG. 7 shows an internal configuration of the clamp circuit 19. The clamp circuit 19 of FIG. 7 includes a voltage supply circuit 19a and a switch 19b. The voltage supply circuit 19a generates a clamp voltage Vclmp2 according to the output voltage Vout, and outputs the clamp voltage Vclmp2 from its own output terminal. The clamp voltage Vclmp2 may be a voltage proportional to the output voltage Vout. That is, it may be set such that "Vclmp2=k×Vout," where k is a fixed positive coefficient (e.g., a coefficient less than 1). A switch 19b is inserted in series between the output terminal of the voltage supply circuit 19a and the node 15c. Only when the switch 19b is turned on, the output terminal of the voltage supply circuit 19a and the node 15c are electrically connected, and the clamp voltage Vclmp2 outputted from the voltage supply circuit 19a is applied to the node 15c. When the switch 19b is turned off, the output terminal of the voltage supply circuit 19a and the node 15c are disconnected, and no current flows between the output terminal of the voltage supply circuit 19a and the node 15c.

The logic circuit 20 controls a state of the switch 19b. The logic circuit 20 keeps the switch 19b in an off state in principle, and turns the switch 19b on for a predetermined clamp time Tclmp2 only when returning from the sleep mode to the normal mode. The clamp time Tclmp2 is determined such that the switch 19b is turned off after the voltage of the node 15c reaches the clamp voltage Vclmp2 through the turn-on of the switch 19b.

Due to the function of the clamp circuit 19, it is expected that the output duty will be optimized immediately after returning to the normal mode. At this time, when the error voltage Verr is unstable, it may take time to stabilize the output voltage Vout (at the target voltage Vtg) depending on the error voltage Verr. Taking this into consideration, when returning from the sleep mode to the normal mode, a proper clamp voltage Vclmp1 is supplied from the clamp circuit 18 to the capacitor 12b.

Figure 8:
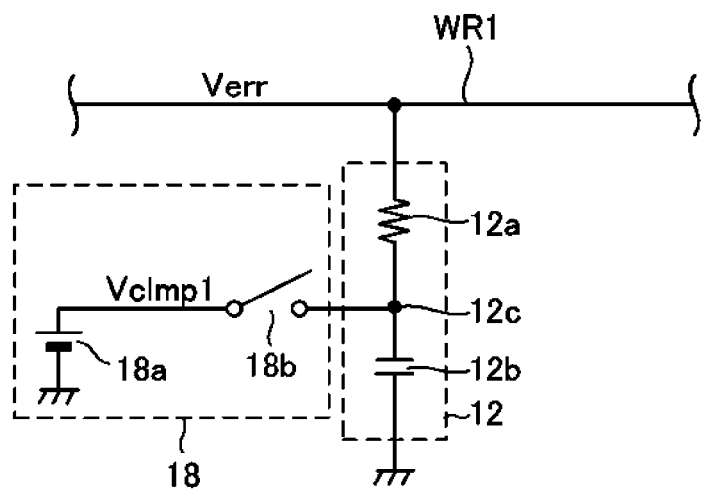
FIG. 8 is a diagram showing a configuration of a clamp circuit relating to an error voltage in the example EX1_1 according to the first embodiment of the present disclosure.

FIG. 8 shows an internal configuration of the clamp circuit 18. The clamp circuit 18 of FIG. 8 includes a voltage source 18a and a switch 18b. Although the clamp circuit 18 is also connected to the wiring WR1 as described above, this state is not shown in FIG. 8. The voltage source 18a generates a clamp voltage Vclmp1 having a predetermined fixed voltage value and outputs the clamp voltage Vclmp1 from its own output terminal. A switch 18b is inserted in series between the output terminal of the voltage source 18a and the node 12c. Only when the switch 18b is turned on, the output terminal of the voltage source 18a and the node 12c are electrically connected, and the clamp voltage Vclmp1 outputted from the voltage source 18a is applied to the node 12c. When the switch 18b is turned off, the output terminal of the voltage source 18a and the node 12c are disconnected, and no current flows between the output terminal of the voltage source 18a and the node 12c.

The logic circuit 20 controls a state of the switch 18b. The logic circuit 20 keeps the switch 18b in an off state in principle, and turns the switch 18b on for a predetermined clamp time Tclmp1 only when returning from the sleep mode to the normal mode. The clamp time Tclmp1 is determined such that the switch 18b is turned off after the voltage of the node 12c reaches the clamp voltage Vclmp1 through the turn-on of the switch 18b.

According to this Example, the output voltage Vout may be quickly stabilized at the target voltage Vtg after returning to the normal mode.

Example EX1_2

Figure 9:
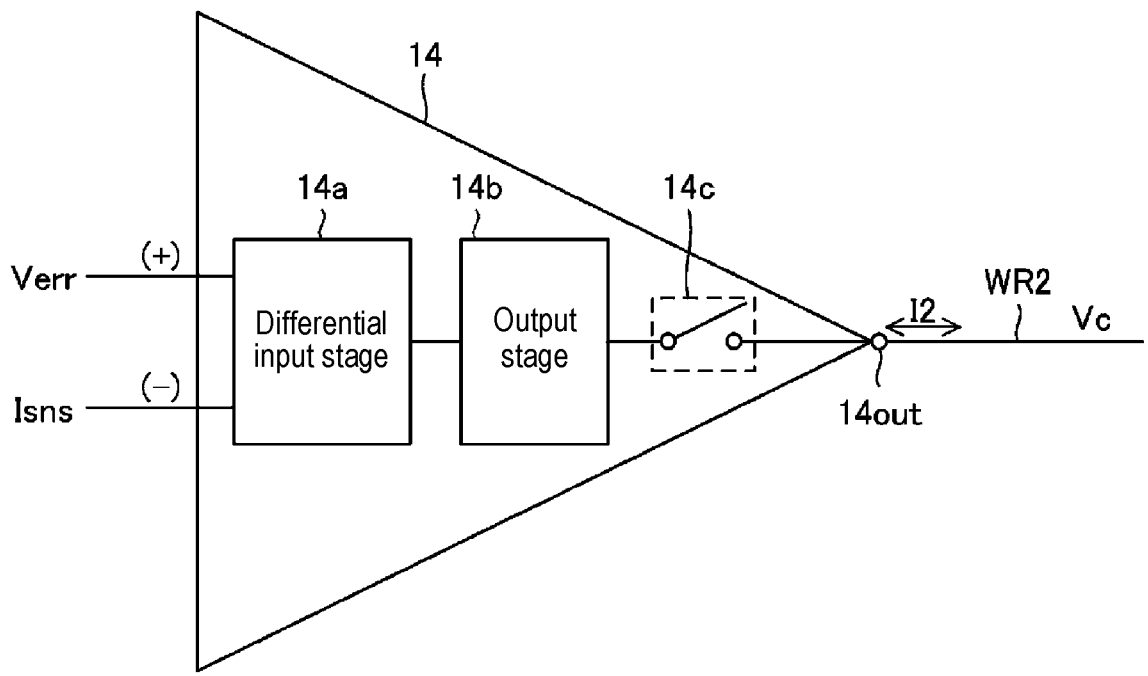
FIG. 9 is a schematic internal configuration diagram of a differential amplifier in an example EX1_2 according to the first embodiment of the present disclosure.

Example EX1_2 will be described. FIG. 9 is an internal block diagram of the differential amplifier 14. The differential amplifier 14 includes a differential input stage 14a configured to generate a difference detection signal corresponding to the difference between the voltages Verr and Isns, an output stage 14b configured to generate a current signal 12 corresponding to the difference detection signal and output the current signal 12 to the wiring WR2, and an output switch 14c connected to the wiring WR2. An output switch 14c is inserted in series between the output terminal 14out and the output stage 14b. Therefore, the current signal 12 is transmitted to the wiring WR2 via the output terminal 14out only when the output switch 14c is turned on.

The logic circuit 20 controls a state of the output switch 14c. The logic circuit 20 controls such that the output switch 14c is turned on in the normal mode. When the output switch 14c is turned on (thus, in the normal mode), the differential amplifier 14 supplies the current (positive or negative charges) corresponding to the current signal 12 to the wiring WR2 through the output switch 14c according to the difference between the voltages Verr and Isns, whereby a comparison voltage Vc corresponding to the difference between the voltages Verr and Isns is generated on the wiring WR2.

The logic circuit 20 controls the output switch 14c to be turned off in the sleep mode. When the output switch 14c is turned off (thus, in sleep mode), the current flowing between the differential amplifier 14 and the wiring WR2 is cut off.

More specifically, in the normal mode, the output stage 14b raises the comparison voltage Vc by supplying a source current (positive output charges) corresponding to the difference between the voltages Verr and Isns to the wiring WR2 through the turned-on output switch 14c. Alternatively, in the normal mode, the output stage 14b lowers the comparison voltage Vc by drawing a sink current (positive input charges) corresponding to the difference between the voltages Verr and Isns from the wiring WR2 through the turned-on output switch 14c. The differential amplifier 14 is provided with a current generation circuit configured to generate a source current and a sink current for the wiring WR2 in the normal mode. The current generation circuit is included in the output stage 14b. Thus, the output switch 14c is provided between the current generation circuit and the wiring WR2.

When the operation mode shifts from the normal mode to the sleep mode, the driving of the current generation circuit of the differential amplifier 14 is stopped under the control of the logic circuit 20. When returning from the sleep mode to the normal mode, the current generation circuit of the differential amplifier 14 is activated. At this time, the differential amplifier 14 activates the current generation circuit and then turns on the output switch 14c.

Figure 10:
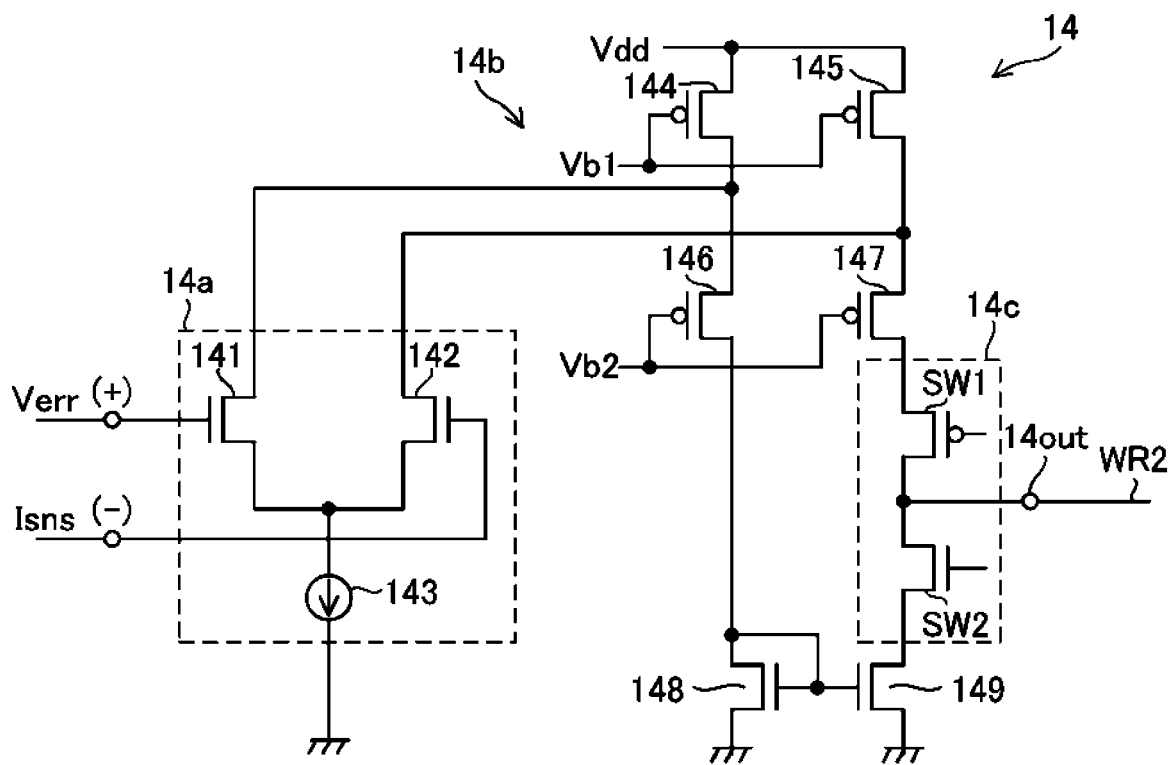
FIG. 10 is a diagram showing an internal circuit example of a differential amplifier in the example EX1_2 according to the first embodiment of the present disclosure.

FIG. 10 shows a circuit example of the differential amplifier 14. The differential amplifier 14 of FIG. 10 includes components referred to by reference symbols 141 to 149, SW1 and SW2. In the circuit of FIG. 10, components 141 to 143 constitute a differential input stage 14a, components 144 to 149 constitute an output stage 14b, and components SW1 and SW2 constitute an output switch 14c. The current generation circuit in the differential amplifier 14 includes the components 144 to 149. The components 141, 142, 148 and 149 are N-channel MOSFETs, and the components 144 to 147 are P-channel MOSFETs. The transistors 141 and 142 are configured as transistors having the same characteristics. The transistors 144 and 145 are configured as transistors having the same characteristics. The transistors 146 and 147 are configured as transistors having the same characteristics. The transistors 148 and 149 are configured as transistors having the same characteristics. The component 143 is a constant current source. The component SW1 is a source switch, and the component SW2 is a sink switch. The components SW1 and SW2 include a P-channel MOSFET and an N-channel MOSFET, respectively. Hence, in the following description, the components SW1 and SW2 may be referred to as transistors SW1 and SW2.

The gates of the transistors 141 and 142 are connected to the non-inverting input terminal and the inverting input terminal of the differential amplifier 14, respectively. The sources of the transistors 141 and 142 are commonly connected. The transistors 141 and 142 constitute a differential input pair for the differential amplifier 14. The constant current source 143 is configured to allow a constant current to flow toward the ground from the node where the sources of the transistors 141 and 142 are connected.

A power supply voltage Vdd is applied to each of the sources of the transistors 144 and 145. The power supply voltage Vdd is an internal power supply voltage generated within the power supply IC 2A. The power supply voltage Vdd has a positive DC voltage value. A common voltage Vb1 is applied to the gates of the transistors 144 and 145. The drain of the transistor 141 is connected to the drain of the transistor 144 and the source of the transistor 146. The drain of the transistor 142 is connected to the drain of the transistor 145 and the source of the transistor 147. A common voltage Vb2 is applied to the gates of the transistors 146 and 147.

The drain of the transistor 146 is commonly connected to the drain and gate of the transistor 148 and the gate of the transistor 149. Each of the sources of the transistors 148 and 149 is connected to the ground. The drain of the transistor 147 is connected to the source of the transistor SW1. The drain of the transistor 149 is connected to the source of the transistor SW2. The drains of the transistors SW1 and SW2 are commonly connected to the output terminal 14out.

In the normal mode, the differential amplifier 14 of FIG. 10 is in a normal operation state. In the normal operation state of the differential amplifier 14, the constant current source 143 is driven to generate a constant current, an appropriate bias voltage is applied to each of the gates of the transistors 144 to 147, and the transistors SW1 and SW2 are turned on. The expression "appropriate bias voltage is applied to each of the gates of the transistors 144 to 147" refers to a state in which "Vdd>Vb1" and "Vdd>Vb2" are satisfied and a current may flow through each of channels of the transistors 144 to 147. In the normal operation state of the differential amplifier 14, the current mirror circuit including the transistors 148 and 149 operates such that the drain current values of the transistors 148 and 149 match each other.

In the normal operation state of the differential amplifier 14, the drain current values of the transistors 141 and 142 match each other in a balanced state in which there is no potential difference between the non-inverting input terminal and the inverting input terminal. Therefore, the drain current values of the transistors 146 and 147 match each other. As a result, the entire drain current of the transistor 147 flows to the ground via the transistor 149. Therefore, no current flows through the output terminal 14out, and no charge is inputted or outputted between the differential amplifier 14 and the wiring WR2.

In the normal operation state of the differential amplifier 14, in a first unbalanced state in which the potential of the non-inverting input terminal is higher than the potential of the inverting input terminal (i.e., in a state of "Verr>Isns"), the drain current of the transistor 147 is larger than the drain current of the transistor 146. Since the drain current value of the transistor 146 is equal to the drain current value of the transistor 148 and the drain current value of the transistor 149, respectively, a source current (positive output charges) is supplied to the wiring WR2 via the transistor SW1 and the output terminal 14out in the first unbalanced state in the normal operation state. The magnitude of the source current depends on the potential difference between the non-inverting input terminal and the inverting input terminal.

In the normal operation state of the differential amplifier 14, in a second unbalanced state in which the potential of the inverting input terminal is higher than the potential of the non-inverting input terminal (i.e., in a state of "Verr<Isns"), the drain current of the transistor 146 is larger than the drain current of the transistor 147. Then, in the second unbalanced state in the normal operation state, a sink current (positive input charges) is drawn from the wiring WR2 through the output terminal 14out and the transistor SW2. The magnitude of the sink current depends on the potential difference between the non-inverting input terminal and the inverting input terminal.

Figure 11:
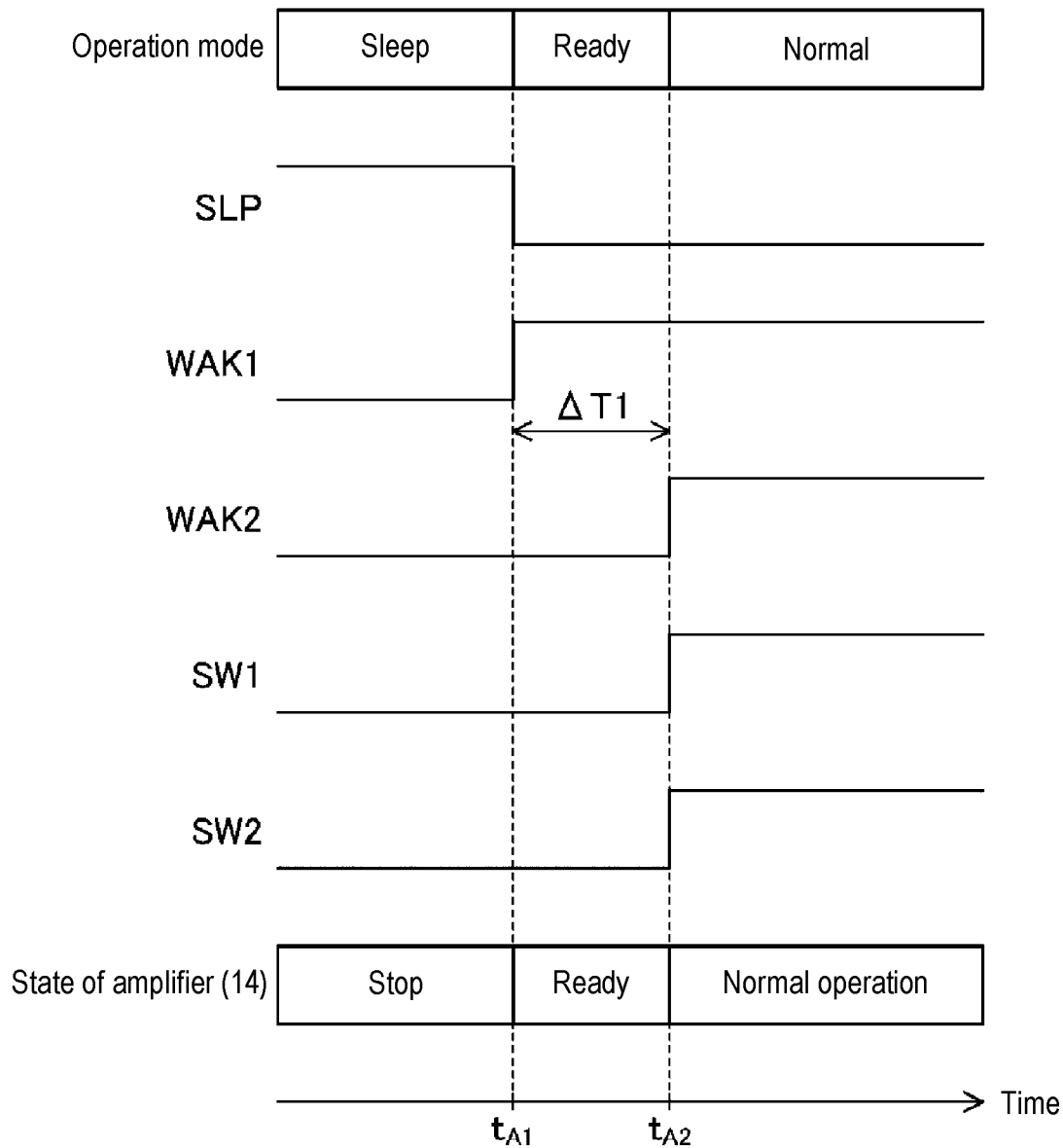
FIG. 11 is a sequence diagram when returning from a sleep mode to a normal mode in the example EX1_2 according to the first embodiment of the present disclosure.

Referring to FIG. 11, a sequence when returning from the sleep mode to the normal mode will be described. Now, it is assumed that the control signal SLP is maintained at a high level before time $t_{A1}$, and as a result, the operation mode is the sleep mode until time $t_{A1}$. Further, it is assumed that a down-edge is generated in the control signal SLP at time $t_{A1}$. The logic circuit generates a control signal WAK1, which is a return control signal, and a control signal WAK2, which is an output release control signal, based on the control signal SLP. The control signals WAK1 and WAK2 are binary signals having either a low level or a high level, like the control signal SLP.

The logic circuit 20 sets the control signal WAK1 to a low level during the high level period of the control signal SLP. Therefore, the operation mode during the low level period of the control signal WAK1 is the sleep mode. The logic circuit 20 sets the control signal WAK1 to a high level during the low level period of the control signal SLP. Therefore, an up-edge is generated in the control signal WAK1 at time $t_{A1}$. The control signal WAK2 is at a low level during the high level period of the control signal SLP. The logic circuit 20 generates an up-edge in the control signal WAK2 at time $t_{A2}$ after a predetermined time Δt1 has elapsed from the down-edge timing of the control signal SLP.

The state of the differential amplifier 14 is set to any one of a stop state, a ready state and a normal operation state based on the control signals WAK1 and WAK2.

In the sleep mode (i.e., while the control signal WAK1 is at a low level), the state of the differential amplifier 14 is in a stop state. When the differential amplifier 14 is in the stop state, all the circuits configured to generate a current within the differential amplifier 14 are stopped. In the circuit of FIG. 10, when the differential amplifier 14 is in the stop state, the constant current source 143 stops driving, and the same voltage as the power supply voltage Vdd is set to the voltages Vb1 and Vb2 such that no current flows through the transistors 144 to 149. In other words, when the differential amplifier 14 is in the stop state (thus, in the sleep mode), the current generation circuit in the differential amplifier 14 stops driving. As a result, power may be saved. Moreover, when the differential amplifier 14 is in the stop state (thus, in the sleep mode), the transistors SW1 and SW2 are kept in an off state.

Triggered by the up-edge of the control signal WAK1, the state of the differential amplifier 14 shifts from the stop state to the ready state. In the ready state of the differential amplifier 14, the constant current source 143 is driven (that is, the constant current source 143 generates a constant current), and an appropriate bias voltage is applied to each of the gates of the transistors 144 to 147. In other words, the differential input stage 14a and the output stage 14b are driven at time $t_{A1}$. However, after time $t_{A1}$, a certain amount of time is required for the states of the differential input stage 14a and the output stage 14b to stabilize. A predetermined time Δt1 is secured as the time required for stabilizing the states of the differential input stage 14a and the output stage 14b. Further, in the ready state of the differential amplifier 14, the transistors SW1 and SW2 are kept in an off state. Therefore, electric charges are prevented from being exchanged between the differential amplifier 14 and the wiring WR2 while the differential input stage 14a and the output stage 14b are in an unstable state.

When an up-edge is generated in the control signal WAK2 after the up-edge of the control signal WAK1, the state of the differential amplifier 14 shifts from the ready state to the normal operation state. That is, the state of the differential amplifier 14 is in the ready state between times $t_{A1}$ and $t_{A2}$. The state of the differential amplifier 14 shifts to the normal operation state by turning on the transistors SW1 and SW2 at time $t_{A2}$. By supplying two different gate signals based on the control signal WAK2 to the gates of the transistors SW1 and SW2, the on/off of the transistors SW1 and SW2 may be controlled.

The switches 18b and 19b in the clamp circuits 18 and 19 (see FIGS. 8 and 7) are turned on, for example, only during the period in which the control signal WAK1 is at a high level and the control signal WAK2 is at a low level. In this case, the switches 18b and 19b are turned on during the entire period between times $t_{A1}$ and $t_{A2}$. However, the switches 18b and 19b may be turned on only during a part of the period between times $t_{A1}$ and $t_{A2}$. For example, the logic circuit 20 may turn on the switches 18b and 19b at time $t_{A1}$ based on the up-edge of the control signal WAK1, and then may turn off the switches 18b and 19b before time $t_{A2}$.

When an up-edge is generated in the control signal WAK2 after the generation of the up-edge in the control signal WAK1, the logic circuit 20 sets the operation mode to the normal mode. Therefore, the switching operation is performed after time $t_{A2}$. The operation mode between times $t_{A1}$ and $t_{A2}$ is understood to belong to the ready mode, which belongs neither to the sleep mode nor to the normal mode. In the ready mode, no switching operation is performed, and the switching circuit MM may be in the Hi-Z state. However, the switching operation may be resumed from the ready mode (i.e., during the period between times $t_{A1}$ and $t_{A2}$).

As described above, when returning from the sleep mode to the normal mode, a sequence is introduced in which the differential amplifier 14 turns on the output switch 14c (SW1 and SW2 in FIG. 10) after activating the circuit component (including the current generation circuit) configured to generate various currents. In a case where the differential input stage 14a and the output stage 14b are activated in synchronization with the up-edge of the control signal WAK1 without providing the output switch 14c, electric charges are exchanged between the differential amplifier 14 and the wiring WR2 while the differential input stage 14a and the output stage 14b are in an unstable state. This may give undesirable fluctuations in the contrast voltage Vc. As a result, the output voltage Vout after the return may become unstable (there may be a large deviation from the target voltage Vtg temporarily). By providing the above sequence, it is expected that the output voltage Vout will quickly converge to the target voltage Vtg after returning to the normal mode.

Figure 12:
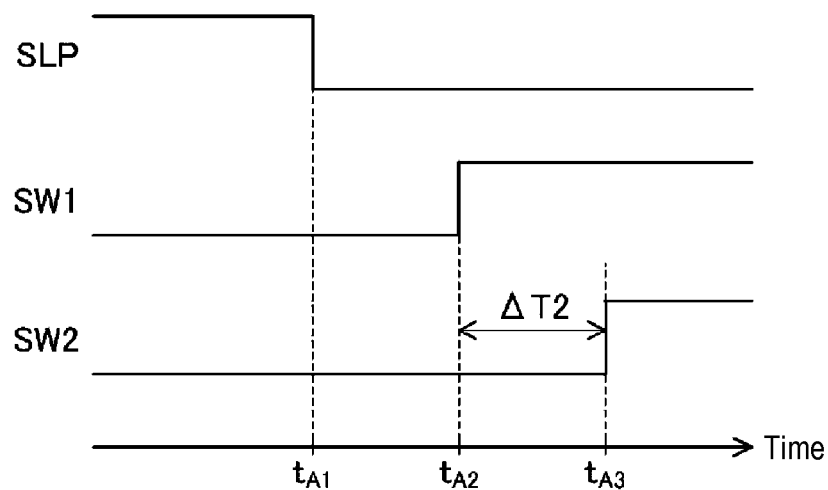
FIG. 12 is a turn-on sequence diagram of two switches that may be employed when returning from a sleep mode to a normal mode in the example EX1_2 according to the first embodiment of the present disclosure.

When returning from the sleep mode to the normal mode, instead of turning on the transistors SW1 and SW2 at the same time, one of the transistors SW1 and SW2 may be first turned on, and then the other may be turned on. That is, for example, as shown in FIG. 12, only the transistor SW1 of the transistors SW1 and SW2 may be turned on at time $t_{A2}$, and then the transistor SW2 may be turned on at time $t_{A3}$. Time $t_{A3}$ is a time that comes after time $t_{A2}$ by a predetermined minute time Δt2. After the control signal SLP shifts to a low level at time $t_{A1}$, it is maintained at a low level including time $t_{A3}$.

By providing the sequence shown in FIG. 12, only the source current is supplied from the differential amplifier 14 to the wiring WR2 through the channel of the transistor SW1 between times $t_{A2}$ and $t_{A3}$. The output duty immediately after returning to the normal mode increases accordingly. As a result, it is possible to suppress the drop in the output voltage Vout immediately after returning to the normal mode.

Although different from FIG. 12, the transistor SW2 may be turned on at time $t_{A2}$, and then the transistor SW1 may be turned on at time $t_{A3}$.

Example EX1_3

Figure 13:
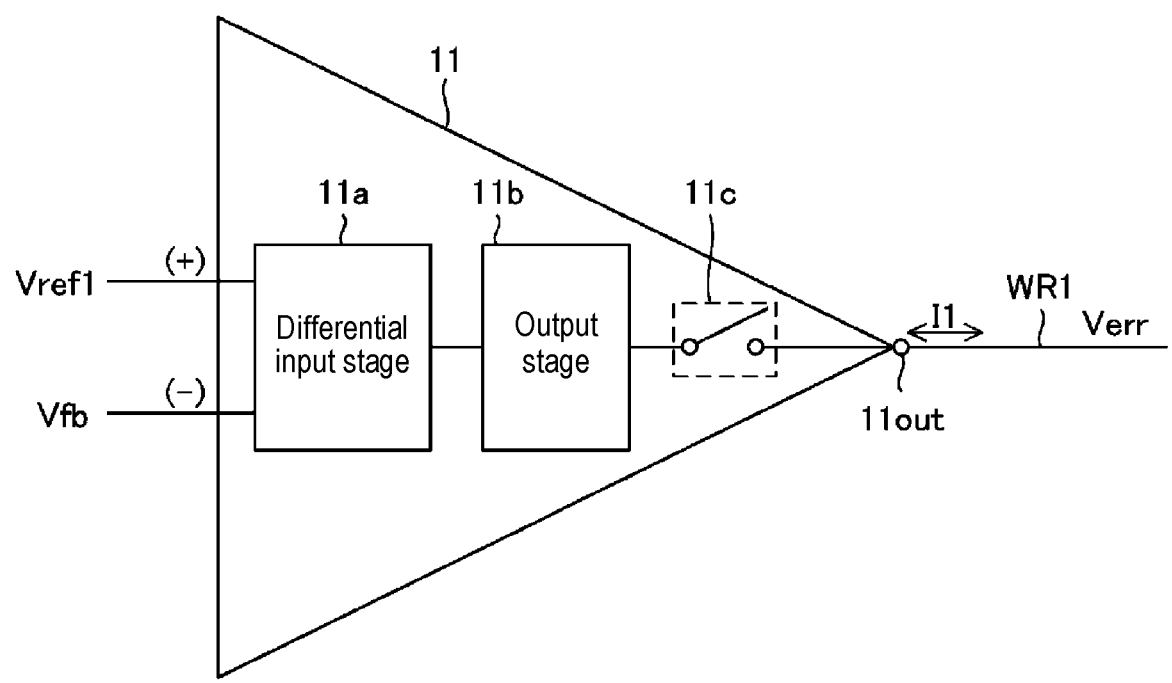
FIG. 13 is a schematic internal configuration diagram of an error amplifier in an example EX1_3 according to the first embodiment of the present disclosure.

Example EX1_3 will be described. The configuration and operation of the differential amplifier 14 described in Example EX1_2 may also apply to the error amplifier 11. FIG. 13 is an internal block diagram of the error amplifier 11. The error amplifier 11 includes a differential input stage 11a configured to generate a difference detection signal corresponding to the difference between the voltages Vref1 and Vfb, an output stage 11b configured to generate a current signal I1 corresponding to the difference detection signal and output the current signal I1 to the wiring WR1, and an output switch 11c connected to the wiring WR1. The output switch 11c is inserted in series between the output terminal 11out and the output stage 11b. Therefore, the current signal I1 is transmitted to the wiring WR1 through the output terminal 11out only when the output switch 11c is turned on.

The logic circuit 20 controls the state of the output switch 11c. The logic circuit 20 controls the output switch 11c to be turned on in the normal mode. When the output switch 11c is turned on (thus, in the normal mode), the error amplifier 11 supplies the current (positive or negative charges) corresponding to the current signal I1 to the wiring WR1 through the output switch 11c according to the difference between the voltages Vref1 and Vfb. As a result, an error voltage Verr corresponding to the difference between the voltages Vref1 and Vfb is generated on the wiring WR1.

The logic circuit 20 controls the output switch 11c to be turned off in the sleep mode. When the output switch 11c is turned off (thus, in the sleep mode), the current flowing between the error amplifier 11 and the wiring WR1 is cut off.

More specifically, in the normal mode, the output stage 11b raises the error voltage Verr by supplying a source current (positive output charges) corresponding to the difference between the voltages Vref1 and Vfb to the wiring WR1 through the turned-on output switch 11c. Alternatively, in the normal mode, the output stage 11b lowers the error voltage Verr by drawing a sink current (positive input charges) corresponding to the difference between the voltages Vref1 and Vfb from the wiring WR1 through the turned-on output switch 11c. The error amplifier 11 includes a current generation circuit configured to generate a source current and a sink current for the wiring WR1 in the normal mode. The current generation circuit is included in the output stage 11b. Thus, the output switch 11c is provided between the current generation circuit and the wiring WR1.

When the operation mode shifts from the normal mode to the sleep mode, the driving of the current generation circuit of the error amplifier 11 is stopped under the control of the logic circuit 20. When returning from the sleep mode to the normal mode, the current generation circuit of the error amplifier 11 is activated. At this time, the error amplifier 11 activates the current generation circuit and then turns on the output switch 11c.

Figure 14:
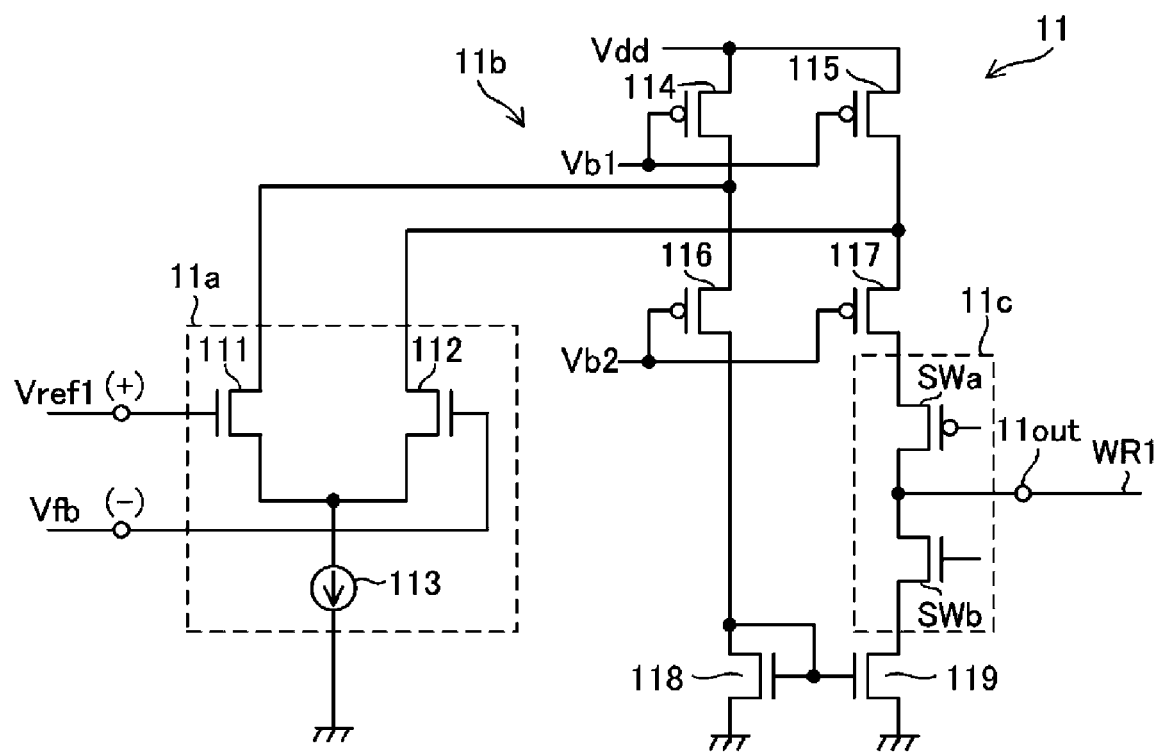
FIG. 14 is a diagram showing an internal circuit example of an error amplifier in the example EX1_3 according to the first embodiment of the present disclosure.

FIG. 14 shows a circuit example of the error amplifier 11. The error amplifier 11 of FIG. 14 includes components referred to by reference symbols 111 to 119, SWa, and SWb. In the circuit of FIG. 14, the components 111 to 113 constitute a differential input stage 11a, the components 114 to 119 constitute an output stage 11b, and components SWa and SWb constitute an output switch 11c. The current generation circuit in the error amplifier 11 includes the components 114 to 119. The components 111, 112, 118, and 119 are N-channel MOSFETs, and the components 114 to 117 are P-channel MOSFETs. The component 113 is a constant current source. The component SWa is a source switch, and the component SWb is a sink switch. The components SWa and SWb are composed of a P-channel MOSFET and an N-channel MOSFET, respectively. Hence, in the following description, the components SWa and SWb may be referred to as transistors SWa and SWb.

The error amplifier 11 of FIG. 14 has the same configuration as the differential amplifier 14 of FIG. 10. The components 111 to 119, SWa, and SWb in the error amplifier 11 correspond to the components 141 to 149, SW1, and SW2 in the differential amplifier 14, respectively. The description of Example EX1_2 may be applied to Example EX1_3. In this application, the differential amplifier 14 in Example EX1_2 may be replaced with the error amplifier 11 in Example EX1_3, and the reference symbols 14a, 14b, 14c, 14out, 12, WR2, 141 to 149, SW1, and SW2 in Example EX1_2 may be replaced with reference symbols 11a, 11b, 11c, 11out, I1, WR1, 111 to 119, SWa, and SWb in Example EX1_3, respectively.

In the normal mode, the error amplifier 11 of FIG. 14 is in a normal operation state. In the normal operation state of the error amplifier 11, the constant current source 113 is driven to generate a constant current, an appropriate bias voltage is applied to each of the gates of the transistors 114 to 117, and the transistors SWa and SWb are turned on. In the normal operation state of the error amplifier 11, depending on the potential difference between the non-inverting input terminal and the inverting input terminal, a source current (positive output charges) is supplied to the wiring WR1 through the transistor SWa and the output terminal 11out, or a sink current (positive input charges) is drawn from the wiring WR1 through the output terminal 11out and the transistor SWb.

Figure 15:
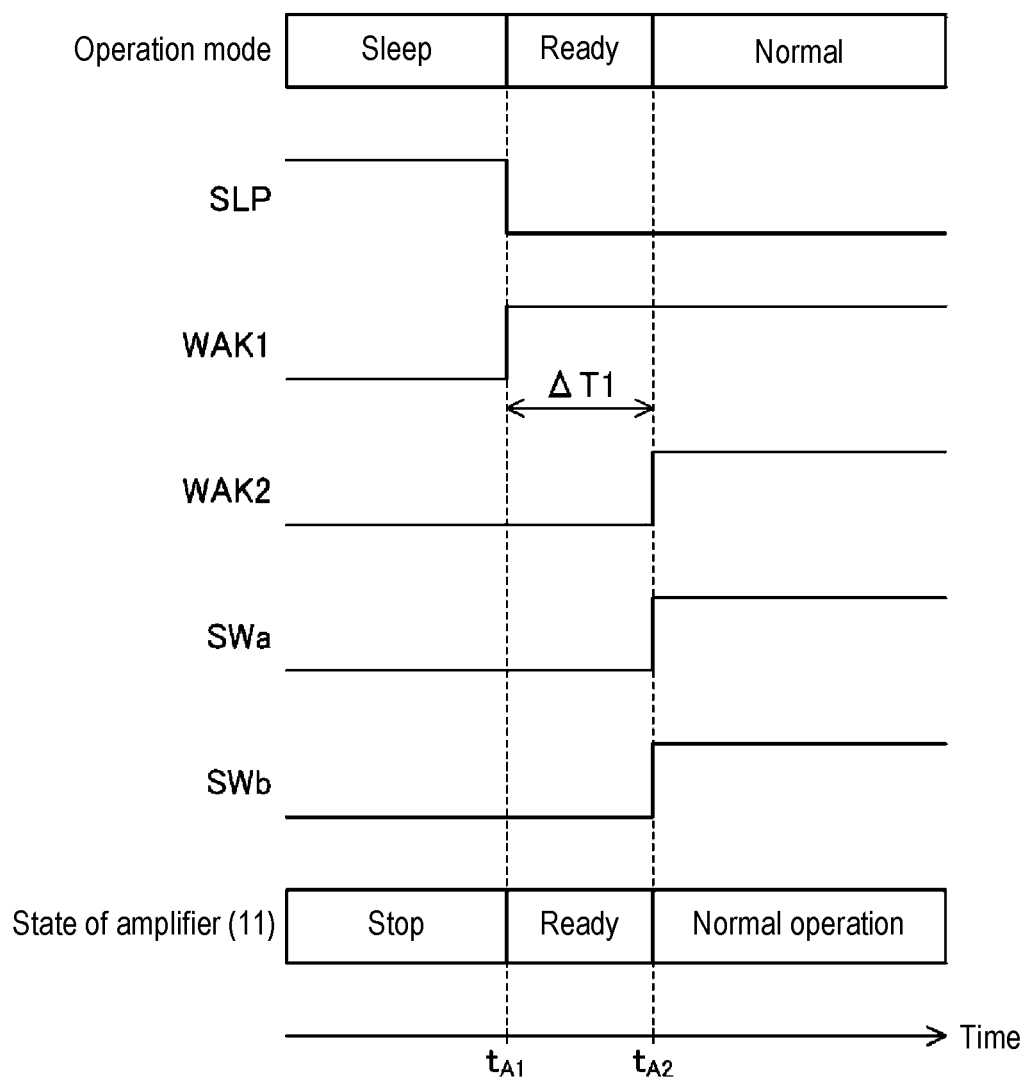
FIG. 15 is a sequence diagram when returning from a sleep mode to a normal mode in the example EX1_3 according to the first embodiment of the present disclosure.

FIG. 15 shows the sequence when returning from the sleep mode to the normal mode, which is related to the error amplifier 11. The sequence of FIG. 15 is also the same as the sequence shown in FIG. 11, and the relationship between the control signal SLP and the control signals WAK1 and WAK2 is also the same as shown in Example EX1_2.

The state of the error amplifier 11 may be set to any one of a stop state, a ready state, and a normal operation state based on the control signals WAK1 and WAK2.

In the sleep mode (i.e., while the control signal WAK1 is at a low level), the error amplifier 11 is in a stop state. When the error amplifier 11 is in the stop state, all the circuits configured to generate a current within the error amplifier 11 are stopped. In the circuit of FIG. 14, when the error amplifier 11 is in the stop state, the constant current source 113 stops driving, and the same voltage as the power supply voltage Vdd is set to the voltages Vb1 and Vb2. Thus, no current flows through the transistors 114 to 119. In other words, when the error amplifier 11 is in the stop state (thus, in the sleep mode), the current generation circuit in the error amplifier 11 stops driving. As a result, power saving may be achieved. Moreover, in the stop state of the error amplifier 11 (thus, in the sleep mode), the transistors SWa and SWb are kept in an off state.

Triggered by the up-edge of the control signal WAK1, the state of the error amplifier 11 shifts from the stop state to the ready state. In the ready state of the error amplifier 11, the constant current source 113 is driven (that is, the constant current source 113 generates a constant current), and an appropriate bias voltage is applied to each of the gates of the transistors 114 to 117. In other words, the differential input stage 11a and the output stage 11b are activated at time $t_{A1}$. In the ready state of the error amplifier 11, the transistors SWa and SWb are kept in an off state.

When an up-edge is generated in the control signal WAK2 after the up-edge of the control signal WAK1, the state of the error amplifier 11 shifts from the ready state to the normal operation state. That is, the state of the error amplifier 11 is in the ready state between times $t_{A1}$ and $t_{A2}$, and the state of the error amplifier 11 shifts to the normal operation state by turning on the transistors SWa and SWb at time $t_{A2}$. The on/off of the transistors SWa and SWb may be controlled by supplying two different gate signals based on the control signal WAK2 to the gates of the transistors SWa and SWb.

As described above, when returning from the sleep mode to the normal mode, a sequence is introduced in which the error amplifier 11 turns on the output switch 11c (SWa and SWb in FIG. 14) after activating the circuit component (including the current generation circuit) configured to generate various currents. In a case where the differential input stage 11a and the output stage 11b are activated in synchronization with the up-edge of the control signal WAK1 without providing the output switch 11c, electric charges are exchanged between the error amplifier 11 and the wiring WR1 while the differential input stage 11a and the output stage 11b are in an unstable state. This may give undesirable fluctuations in the error voltage Verr. As a result, the output voltage Vout after the return may become unstable. By providing the above sequence, it is expected that the output voltage Vout will quickly converge to the target voltage Vtg after returning to the normal mode.

When returning from the sleep mode to the normal mode, instead of turning on the transistors SWa and SWb at the same time, one of the transistors SWa and SWb may be first turned on and then the other may be turned on. For example, like the method shown in FIG. 12, the transistor SWa may be turned on at time $t_{A2}$ and then the transistor SWb may be turned on at time $t_{A3}$. Alternatively, for example, the transistor SWb may be turned on at time $t_{A2}$ and then the transistor SWa may be turned on at time $t_{A3}$.

It is also possible to use a combination of the differential amplifier 14 of FIG. 10 and the error amplifier 10 of FIG. 14. In this case, the transistors SW1, SW2, SWa, and SWb may be turned on simultaneously at time $t_{A2}$. Alternatively, any one or more of the transistors SW1, SW2, SWa, and SWb may be turned on at time $t_{A2}$, and the remaining transistors may be turned on at time $t_{A3}$. For example, as shown in FIG. 12, the transistor SW1 is turned on at time $t_{A2}$ and the transistor SW2 is turned on at time $t_{A3}$. At this time, the transistors SWa and SWb are turned on simultaneously at time $t_{42}$ or $t_{43}$, or any one of the transistors SWa and SWb is turned on at time $t_{42}$ and the other is turned on at time $t_{43}$. It is also possible to make the turn-on timings of the transistors SW1, SW2, SWa, and SWb different from one another when returning to the normal mode.

Example EX1_4

Example EX1_4 will be described.

Figure 16:
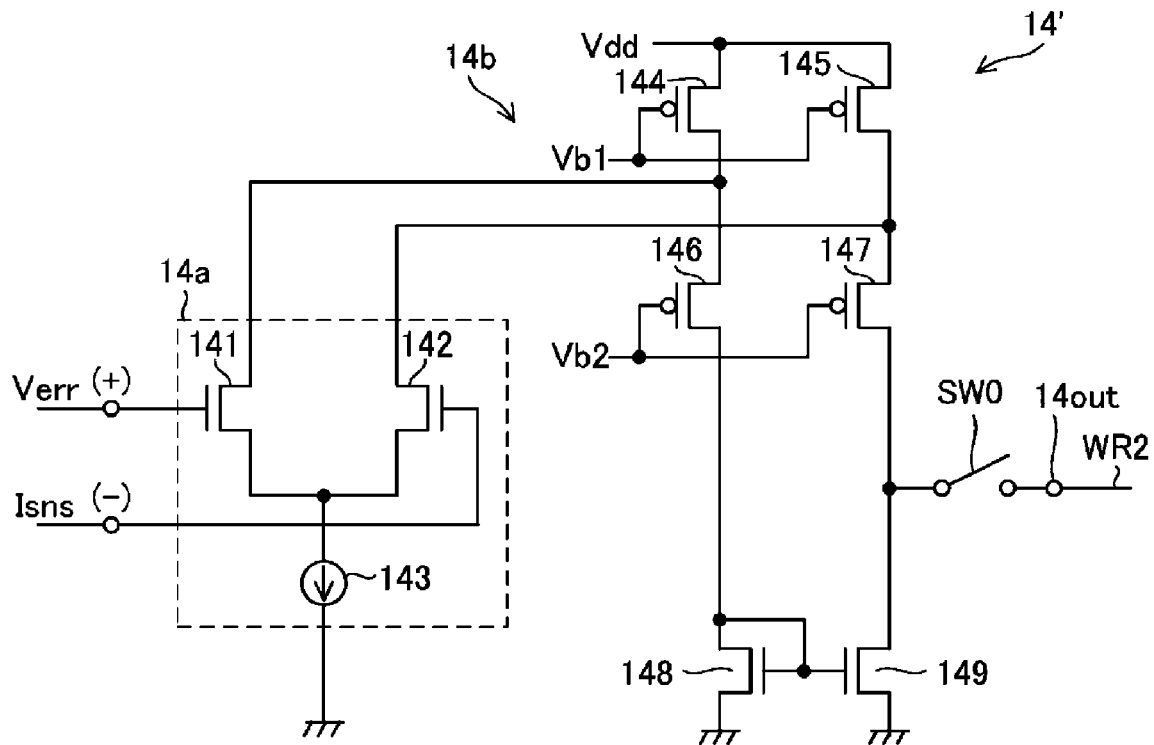
FIG. 16 is a diagram showing a modified internal circuit example of a differential amplifier in an example EX1_4 according to the first embodiment of the present disclosure.

In the differential amplifier 14 according to Example EX1_2, the output switch 14c may also be configured with a single switch. That is, for example, the switches SW1 and SW2 in the differential amplifier 14 of FIG. 10 may be replaced with the switch SW0 as shown in FIG. 16. The differential amplifier 14 to which the replacement is applied may be incorporated into the power supply IC 2A of FIG. 3. For the sake of convenience, the differential amplifier 14 to which the replacement is applied is referred to as a differential amplifier 14'. In the differential amplifier 14', the switch SW0 corresponds to the output switch 14c of FIG. 9. A bi-directional analog switch may be used as the switch SW0.

According to the above replacement, in the differential amplifier 14', the drains of the transistors 147 and 149 are commonly connected to one end of the switch SW0, and the other end of the switch SW0 is connected to the output terminal 14out (that is, to the wiring WR2 through the output terminal 14out). Except for this point, the differential amplifier 14 of FIG. 10 and the differential amplifier 14' of FIG. 16 have the same configuration. When the differential amplifier 14' is used, the switch SW0 may be turned off in the sleep mode and the ready mode, and may be turned on at time $t_{42}$ (see FIG. 11). A current corresponding to the current signal I2 flows between the differential amplifier 14 and the wiring WR2 only when the switch SW0 is in an on state.

Figure 17:
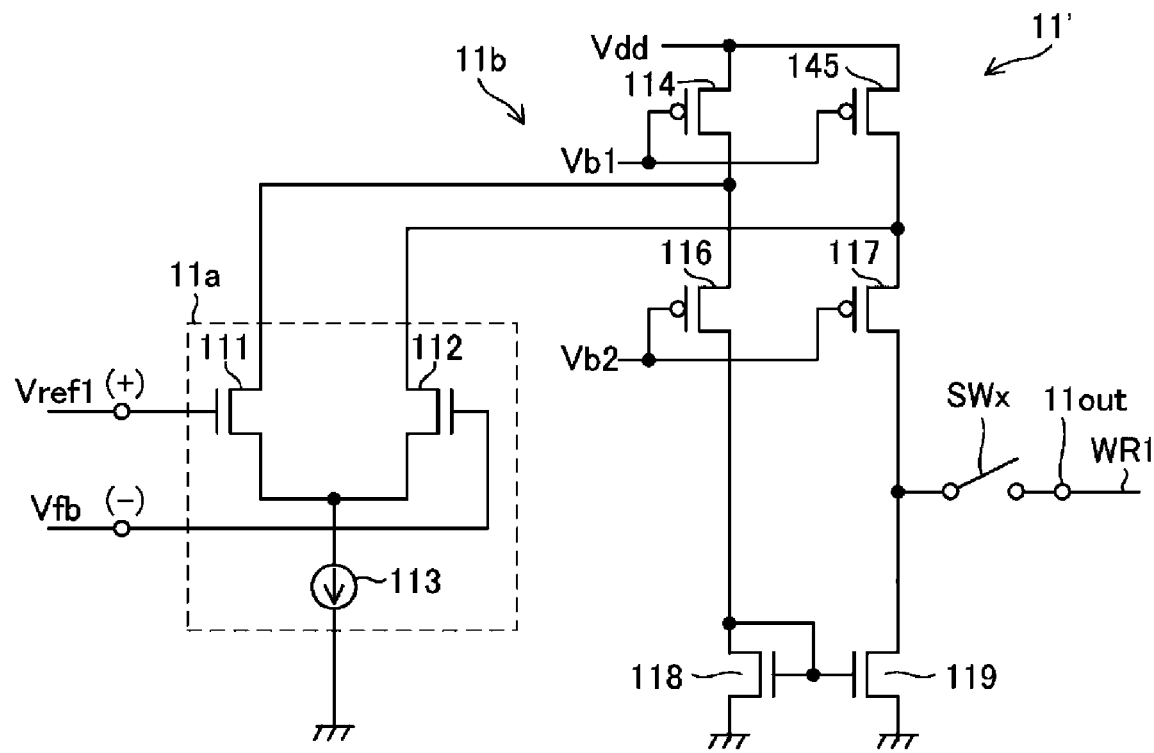
FIG. 17 is a diagram showing a modified internal circuit example of an error amplifier in the example EX1_4 according to the first embodiment of the present disclosure.

Similarly, in the error amplifier 11 according to Example EX1_3, the output switch 11c may be configured with a single switch. That is, for example, the switches SW1 and SW2 in the error amplifier 11 of FIG. 14 may be replaced with a switch SWx as shown in FIG. 17, and the error amplifier 11 to which this replacement is applied may be incorporated into the power supply IC 2A of FIG. 3. For the sake of convenience, the error amplifier 11 to which the replacement is applied is referred to as an error amplifier 11'. In the error amplifier 11', the switch SWx corresponds to the output switch 11c of FIG. 13. A bi-directional analog switch may be used as the switch SWx.

According to the above replacement, in the error amplifier 11', the drains of the transistors 117 and 119 are commonly connected to one end of the switch SWx, and the other end of the switch SWx is connected to the output terminal 11out (that is, to the wiring WR1 through the output terminal 11out). Except for this point, the error amplifier 11 of FIG. 14 and the error amplifier 11' of FIG. 17 have the same configuration. When using the error amplifier 11', the switch SWx may be turned off in the sleep mode and the ready mode, and may be turned on at time $t_{42}$ (see FIG. 15). A current corresponding to the current signal I1 flows between the error amplifier 11 and the wiring WR1 only when the switch SWx is in an on state.

In the power supply IC 2A of FIG. 3, it is arbitrary to use either the configuration of FIG. 10 or the configuration of FIG. 16 for the differential amplifier 14, and it is arbitrary to use either the configuration of FIG. 14 or the configuration of FIG. 17 for the error amplifier 11.

As a preferable combination, the configuration of FIG. 10 may be adopted for the differential amplifier 14, and the configuration of FIG. 17 may be adopted for the error amplifier 11. In this combination, as shown in FIG. 12, it is preferable to turn on the transistor SW1 at time $t_{42}$ and turn on the transistor SW2 at time $t_{43}$, which makes it possible to suppress a drop in the output voltage Vout immediately after returning to the normal mode. At this time, the switch SWx in the error amplifier 11 may be turned on at time $t_{42}$ or $t_{43}$.

Example EX1_5

Example EX1_5 will be described. The states of the error amplifier 11 and the differential amplifier 14 may be changed from the normal operation state to the stop state as soon as the up-edge of the control signal SLP is generated. Alternatively, the states of the error amplifier 11 and the differential amplifier 14 may be changed as follows. That is, after the up-edge of the control signal SLP is generated, the logic circuit 20 monitors whether the control signal SLP is maintained at a high level for a predetermined period of time, and outputs a stop control signal that becomes active when the control signal SLP is maintained at the high level for the predetermined period of time. In response to the active stop control signal, each of the states of the error amplifier 11 and the differential amplifier 14 may shift from the normal operation state to the stop state.

Example EX1_6

Example EX1_6 will be described. An amplitude of the ramp voltage Vramp may be made proportional to the input voltage Vin. At this time, after fixing the lower limit voltage value Vramp_MIN of the ramp voltage Vramp, it is preferable to make the differential voltage value (Vramp_MAX− Vramp_MIN) proportional to the input voltage Vin (see FIG. 4).

Figure 18:
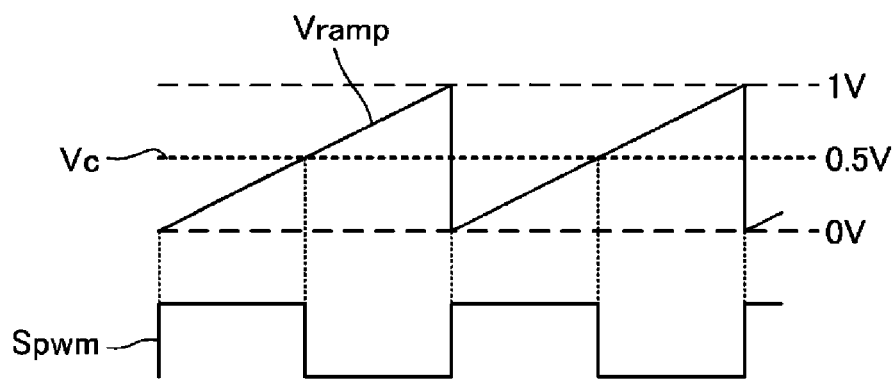
FIG. 18 is a relationship diagram of a ramp voltage, a comparison voltage, and a pulse width modulation signal in an example EX1_6 according to the first embodiment of the present disclosure.
Figure 19:
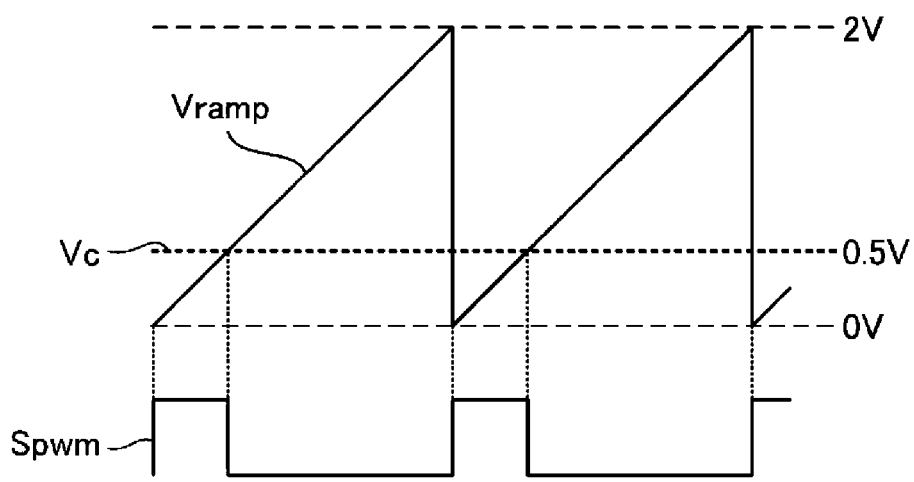
FIG. 19 is a relationship diagram of a ramp voltage, a comparison voltage, and a pulse width modulation signal, in the example EX1_6 according to the first embodiment of the present disclosure.

The significance of the method of Example EX1_6 will be described with reference to FIGS. 18 and 19. Now, for the sake of concrete description, it is assumed that the lower limit voltage value Vramp_MIN is 0 V and the target voltage Vtg is 5 V. It is also assumed that the amplitude of the ramp voltage Vramp is 1.0 V when the input voltage Vin is 10 V. Then, the amplitude of the ramp voltage Vramp is 2.0 V when the input voltage Vin is 20 V. FIG. 18 shows the waveforms of the comparison voltage Vc, the ramp voltage Vramp and the signal Spwm when the input voltage Vin is maintained at 10 V, and FIG. 19 shows the waveforms of the comparison voltage Vc, the ramp voltage Vramp and the signal Spwm when the input voltage Vin is maintained at 20 V.

Under the assumption that the output voltage Vout is stabilized at 5 V, which is the target voltage Vtg and the output current Iout is constant, the output duty in the PWM control is 50% in a case where the input voltage Vin is 10 V, and 25% in a case where the input voltage Vin is 20 V. This means that when the input voltage Vin is 10 V, the comparison voltage Vc is kept around 0.5 V, and when the input voltage Vin is 20 V, the comparison voltage Vc is kept around 0.5 V.

Although the case where the target voltage Vtg is 5 V has been taken into consideration, in a case where the target voltage Vtg is 6 V, which is 1.2 times 5 V, the comparison voltage Vc is kept around 0.6 V regardless of the input voltage Vin. In a case where the target voltage Vtg is 4 V, which is 0.8 times 5 V, the comparison voltage Vc is kept around 0.4 V regardless of the input voltage Vin. That is, when the amplitude of the ramp voltage Vramp is made proportional to the input voltage Vin, the comparison voltage Vc in the PWM control depends only on the output voltage Vout.

Then, in a case where the clamp voltage Vclmp2 is determined according to the output voltage Vout, it is possible to keep the charging voltage of the capacitor 115b at an appropriate voltage according to the output voltage Vout when returning from the sleep mode to the normal mode, and it is possible to immediately optimize the output duty of PWM control after returning to the normal mode.

In the switching power supply device 1, when the input voltage Vin is fixed or the fluctuation range of the input voltage Vin is small, the amplitude of the ramp voltage Vramp may be fixed regardless of the input voltage Vin.

Second Embodiment

A second embodiment of the present disclosure will be described. The second embodiment and a third embodiment of the present disclosure to be described later are embodiments based on the first embodiment. Regarding the matters not specifically described in the second and third embodiments, the description of the first embodiment also applies to the second and third embodiments unless there is a contradiction. However, when interpreting the description of the second embodiment, the descriptions of the second embodiment may take precedence over those of the first embodiment for matters that are contradictory between the first and second embodiments (the same applies to the third embodiment described later). The first to third embodiments may be combined arbitrarily as long as there is no contradiction.

Figure 20:
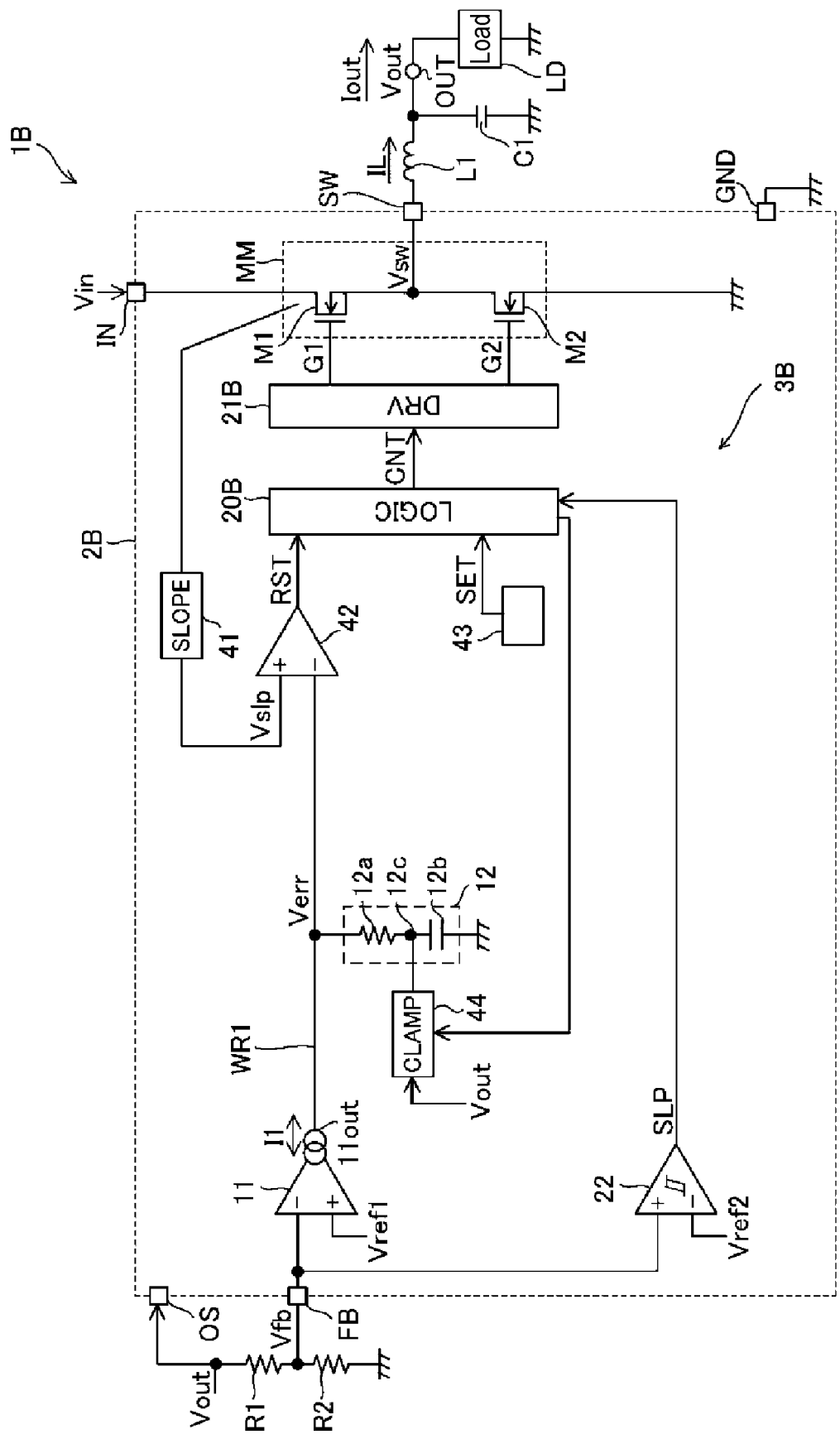
FIG. 20 is an internal configuration diagram of a power supply IC according to a second embodiment of the present disclosure.

Each of the above-described operations when returning from the light load mode to the normal mode may also apply to a case where the number of transconductance amplifiers provided in the power supply IC is one. FIG. 20 shows a configuration of a switching power supply device 1B according to the second embodiment. The switching power supply device 1B is an example of the switching power supply device 1 shown in FIG. 1. The switching power supply device 1B is provided with a power supply IC 2B as the power supply IC 2. The power supply IC 2B is provided with a switching circuit MM and a main control block 3B as the main control block 3. All the matters described in the first embodiment regarding the switching power supply device 1, the power supply IC 2 and the main control block 3 also apply to the switching power supply device 1B, the power supply IC 2B and the main control block 3B as long as there is no contradiction.

The power supply IC 2B shown in FIG. 20 is formed by replacing the components referred to by reference symbols 13 to 21 in the power supply IC 2A shown in FIG. 3 with the components referred to by reference symbols 41 to 44, 20B, and 21B. Except for this replacement, the power supply IC 2B has the same configuration as the power supply IC 2A. Due to the replacement, the control signal SLP from the comparator 22 is supplied to the logic circuit 20B. First, assuming that the control signal SLP is maintained at a low level (that is, assuming that the operation mode is the normal mode), operations of a slope voltage generation circuit 41, a comparator 42, a set signal generation circuit 43, a clamp circuit 44, a logic circuit 20B, and a driver 21B provided in the power supply IC 2B will be described.

The slope voltage generation circuit 41 generates a slope voltage Vslp according to the current flowing through the transistor M1 during the on period of the transistor M1. The current flowing through the transistor M1 during the on period of the transistor M1 is equal to the coil current IL. FIG. 22 shows a waveform example of the slope voltage Vslp. More specifically, the circuit 41 converts the current flowing through the transistor M1 during the on period of the transistor M1 into a voltage to generate a sense voltage proportional to the current. Meanwhile, the circuit 41 generates a sawtooth-shaped ramp voltage that gradually increases from 0 V during the on period of the transistor M1, and generates a sum of the sense voltage and the ramp voltage as the slope voltage Vslp. The slope voltage Vslp is 0 V during a period other than the on period of the transistor M1 (however, the slope voltage Vslp may have a predetermined bias voltage value). As is well known, the addition of the ramp voltage may suppress oscillation of an output feedback loop in current mode control.

The slope voltage Vslp is supplied to the non-inverting input terminal of the comparator 42. The inverting input terminal of the comparator 42 is connected to the wiring WR1 to receive the error voltage Verr. The comparator 42 compares the slope voltage Vslp and the error voltage Verr, and outputs a signal RST corresponding to the comparison result to the logic circuit 20B. The signal RST and signals SET and CNT, which will be described later, are all binary signals having a high level or a low level. The signal RST has a high level when "Vslp>Verr" is satisfied, and has a low level when "Vslp<Verr" is satisfied. The signal RST having a high level functions as a reset signal. Outputting the signal RST having a high level corresponds to issuing a reset signal.

The set signal generation circuit 43 outputs a signal SET to the logic circuit 20B. The set signal generation circuit 43 generates an up-edge in the signal SET at a PWM frequency. The signal SET having a high level functions as a set signal. Outputting the signal SET having the high level corresponds to issuing a set signal.

The logic circuit 20B generates a control signal CNT based on the signals SET and RST and supplies the control signal CNT to the driver 21B. The driver 21B supplies gate signals G1 and G2 based on the control signal CNT to the transistors M1 and M2, thereby causing the switching circuit MM to perform a switching operation. In the switching operation, the transistors M1 and M2 are alternately turned on and off. The error amplifier 11 generates the current signal I1 such that the feedback voltage Vfb and the reference voltage Vref1 are equal to each other. Therefore, through the execution of the switching operation, the output voltage Vout is stabilized at a predetermined target voltage Vtg according to the reference voltage Vref1 and the voltage division ratio by the resistors R1 and R2.

FIG. 21 shows a relationship among the signals SET, RST, CNT, G1, and G2. When the signal SET having a high level is inputted to the logic circuit 20B while the signal RST is at a low level (that is, when the set signal is issued), the control signal CNT has a high level. Thereafter, the control signal CNT is kept at a high level until the signal RST having a high level is inputted to the logic circuit 20B (that is, until the reset signal is issued). When the signal RST having a high level is inputted to the logic circuit 20B while the signal SET is at a low level (that is, when the reset signal is issued), the control signal CNT has a low level. Thereafter, the control signal CNT is kept at a low level until the signal SET having a high level is inputted to the logic circuit 20B (that is, until the set signal is issued). The control signal CNT is maintained at the kept level while the signals SET and RST are both at a low level. The signals SET and RST are not at a high level at the same time. During the period in which the control signal CNT is at a high level, the driver 21B sets the gate signals G1 and G2 to a high level and a low level, respectively, thereby bringing the switching circuit MM into a high output state. During the period in which the control signal CNT is at a low level, the driver 21B sets the gate signals G1 and G2 to a low level and a high level, respectively, thereby bringing the switching circuit MM into a low output state.

FIG. 22 shows a timing chart of the switching operation in the power supply IC 2B. The switching operation will be described starting from a timing $t_{B0}$ at which the switching circuit MM is in a low output state and the signal SET is at a low level. At the timing $t_{B0}$, the slope voltage Vslp is 0 V. Thereafter, the signal SET is kept at a high level for an extremely short time starting from a timing $t_{B1}$. That is, the set signal is issued. When the issued set signal is received and the control signal CNT is switched from a low level to a high level, the switching circuit MM is switched from the low output state to the high output state. During the period in which the output of the switching circuit MM is in the high output state, the coil current IL gradually increases, and the slope voltage Vslp also gradually increases accordingly. Then, when the state satisfying "Vslp<Verr" is switched to the state satisfying "Vslp>Verr" at a timing $t_{B2}$, the output signal RST of the comparator 42 is switched from the low level to the high level, that is, the reset signal is issued. When the issued reset signal is received and the control signal CNT is switched from the high level to the low level, the switching circuit MM is switched from the high output state to the low output state. When the switching circuit MM is in the low output state, the slope voltage Vslp quickly drops to 0 V such that the signal RST returns to the low level. Thereafter, the same operations are repeated.

Thus, in the switching operation of the power supply IC 2B, the set signal is issued at the PWM frequency. Therefore, the transistors M1 and M2 are PWM-controlled at the PWM frequency.

In the second embodiment, the operation of each circuit described above is the operation performed when the operation mode of the power supply IC 2B is set to the normal mode. In the power supply IC 2B, the control signal SLP from the comparator 22 is applied to the logic circuit 20B. The logic circuit 20B may set the operation mode to the normal mode or the sleep mode based on the control signal SLP. The operation mode described in the second embodiment refers to the operation mode of the power supply IC 2B. The method of setting the operation mode based on the control signal SLP is the same as that in the first embodiment. That is, the operation mode is set to the normal mode during the low level period of the control signal SLP, and the switching operation described above is performed in the normal mode. The logic circuit 20B switches the operation mode from the normal mode to the sleep mode at the up-edge of the control signal SLP. In the sleep mode, the logic circuit 20B performs sleep control (switching stop control) to stop the switching operation. Thereafter, the logic circuit 20B switches the operation mode from the sleep mode to the normal mode at the down-edge of the control signal SLP.

The logic circuit 20B may control driving or non-driving of each circuit in the main control block 3B. In the normal mode, the logic circuit 20B drives all circuits in the main control block 3B to realize the switching operation according to the feedback voltage Vfb and the coil current IL. In the sleep mode, the logic circuit 20B preferably stops driving the slope voltage generation circuit 41, the comparator 42, and the set signal generation circuit 43, thereby reducing power consumption. In addition, in the sleep mode, the logic circuit 20B stops driving the error amplifier 11, thereby further reducing power consumption.

That is, the logic circuit 20B performs the switching operation while driving the error amplifier 11 in the normal mode, and stops the switching operation along with stopping the driving of the error amplifier 11 in the sleep mode. However, when returning from the sleep mode to the normal mode, the output duty immediately after the return may become inappropriate unless some measures are taken. Thus, it may take time to stabilize the output voltage Vout (at the target voltage Vtg). For example, in a case where the output duty immediately after the return is too low, the output voltage Vout may fall significantly below the target voltage Vtg immediately after the return.

In view of the foregoing, in the second embodiment, just like the above-described Example EX1_1, when returning from the sleep mode to the normal mode, the clamp circuit 44 supplies a voltage corresponding to the output voltage Vout to the capacitor 12b.

Figure 23:
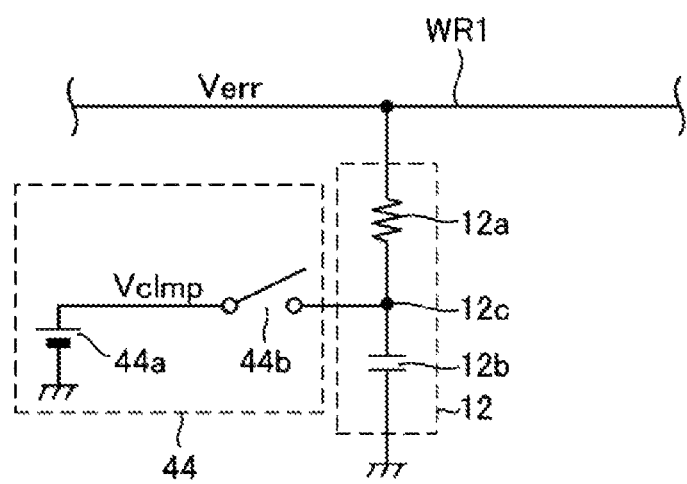
FIG. 23 is a configuration diagram of a clamp circuit according to the second embodiment of the present disclosure.

FIG. 23 shows an internal configuration of the clamp circuit 44. The clamp circuit 44 of FIG. 23 includes a voltage supply circuit 44a and a switch 44b. The voltage supply circuit 44a generates a clamp voltage Vclmp according to the output voltage Vout and outputs the clamp voltage Vclmp from its own output terminal. The clamp voltage Vclmp may be a voltage proportional to the output voltage Vout. That is, it may be set such that "Vclmp=k×Vout," where k is a fixed positive coefficient (e.g., a coefficient less than 1). The switch 44b is inserted in series between the output terminal of the voltage supply circuit 44a and the node 12c. Only when the switch 44b is turned on, the output terminal of the voltage supply circuit 44a and the node 12c are electrically connected, and the clamp voltage Vclmp outputted from the voltage supply circuit 44a is applied to the node 12c. When the switch 44b is turned off, the output terminal of the voltage supply circuit 44a and the node 12c are disconnected, and no current flows between the output terminal of the voltage supply circuit 44a and the node 12c.

The logic circuit 20 controls the state of the switch 44b. In principle, the logic circuit 20 keeps the switch 44b in an off state, and turns the switch 44b on for a predetermined clamp time Tclmp only when returning from the sleep mode to the normal mode. The clamp time Tclmp is defined such that the switch 44b is turned off after the voltage of the node 12c reaches the clamp voltage Vclmp through the turn-on of the switch 44b. As a result, the output voltage Vout may be quickly stabilized at the target voltage Vtg after returning to the normal mode.

Further, the contents shown in Examples EX1_3 to EX1_5 also apply to the second embodiment (except for the contents related to the differential amplifier 14 described in Example EX1_4). These also contribute to stabilization of the output voltage Vout after returning to the normal mode.

When applying Examples EX1_3 to EX1_5 to the second embodiment, the switch 44b in the clamp circuit 44 may be turned on, for example, only during the period in which the control signal WAK1 is at a high level and the control signal WAK2 is at a low level (see FIG. 15). In this case, the switch 44b is turned on during the entire period between times $t_{A1}$ and $t_{A2}$. However, the switch 44b may be turned on only during a part of the period between times $t_{A1}$ and $t_{A2}$. For example, the logic circuit 20B may turn on the switch 44b at time $t_{A1}$ based on the up-edge of the control signal WAK1, and then may turn off the switch 44b before time $t_{A2}$.

Third Embodiment

A third embodiment of the present disclosure will be described. In the third embodiment, application techniques, modified techniques, and the like applicable to the first or second embodiment will be described.

The switching power supply device 1 may be installed in any device. For example, the switching power supply device 1 may be mounted on a vehicle such as an automobile or the like. In this case, an output voltage of a battery provided in the vehicle may be used as the input voltage Vin. Alternatively, a voltage generated by a power supply device (not shown) other than the switching power supply device 1 based on the output voltage of the battery may be used as the input voltage Vin. The load LD may be any electrical equipment provided in the vehicle. For example, the load LD may be an ECU (Electronic Control Unit). Alternatively, the load LD may be an air conditioner, a lamp, a power window, or an airbag.

Although the step-down switching power supply device has been described as an example of the switching power supply device according to the present disclosure, the switching power supply device according to the present disclosure may be a step-up switching power supply device or a step-up/step-down switching power supply device.

High-level and low-level relationships of any signal or voltage may be reversed from the aforementioned relationships without departing from the spirit of the aforementioned description.

The types of the channels of the FETs (field effect transistors) shown in each embodiment are examples. A type of a channel of any FET may be changed between a P-channel type and an N-channel type without departing from the spirit of the aforementioned description. For example, the transistor M1 may include a P-channel MOSFET.

Any of the transistors described above may be any type of transistor as long as there is no problem. For example, the arbitrary transistor described above as a MOSFET may be replaced with a junction FET, an IGBT (Insulated Gate Bipolar Transistor), or a bipolar transistor as long as there is no problem. The arbitrary transistor has a first electrode, a second electrode and a control electrode. In the FET, one of the first and second electrodes is a drain, the other is a source, and the control electrode is a gate. In the IGBT, one of the first and second electrodes is a collector, the other is an emitter, and the control electrode is a gate. In the bipolar transistor not belonging to the IGBT, one of the first and second electrodes is a collector, the other is an emitter, and the control electrode is a base.

The power supply IC 2A of FIG. 3 is provided with a drive control circuit configured to be capable of performing a switching operation according to the comparison voltage Vc. In the configuration of FIG. 3, the drive control circuit includes at least the logic circuit 20. All or part of the ramp voltage generation circuit 16, the comparator 17, and driver 21 may be understood to be included in the components of the drive control circuit.

The embodiments of the present disclosure may be appropriately modified in various ways within the scope of the technical features defined in the claims. The aforementioned embodiments are merely examples of the embodiments of the present disclosure, and the meanings of the terms of the present disclosure and each constituent element are not limited to those described in the aforementioned embodiments. The specific numerical values given in the aforementioned description are merely examples and may, of course, be changed to various numerical values.

SUPPLEMENTARY NOTE

Supplementary Notes according to the present disclosure are provided in which specific configuration examples are shown in the above-described embodiments.

A switching power supply circuit according to an aspect of the present disclosure (see FIGS. 1 and 3), which is a switching power supply circuit (2 or 2A) used in a switching power supply device (1 or 1A) configured to generate an output voltage (Vout) by switching an input voltage (Vin), includes: a switching circuit (MM) configured to switch the input voltage by a switching operation; a first amplifier (11) configured to generate, on a first wiring (WR1), a first voltage (Verr) corresponding to a first difference between a feedback voltage (Vfb) corresponding to the output voltage and a reference voltage (Vref1); a first phase compensation circuit (12) including a first capacitor (12b) provided in series between the first wiring and a fixed potential point and configured to compensate for a phase of the first voltage; a second amplifier (14) configured to generate, on a second wiring (WR2), a second voltage (Vc) corresponding to a second difference between a voltage (Isns) corresponding to a current flowing through the switching circuit and the first voltage; a second phase compensation circuit (15) including a second capacitor (15b) provided in series between the second wiring and the fixed potential point and configured to compensate for a phase of the second voltage; and a drive control circuit configured to be capable of executing the switching operation according to the second voltage, wherein the switching power supply circuit is configured to operate in a first mode (normal mode) or a second mode (sleep mode) according to the feedback voltage, wherein the drive control circuit is configured to, in the first mode, perform the switching operation while driving the first amplifier and the second amplifier, and in the second mode, stop the switching operation by stopping driving the first amplifier and the second amplifier, and wherein when returning from the second mode to the first mode, a specific voltage (Vclmp2) corresponding to the output voltage is supplied to the second capacitor and a predetermined voltage (Vclmp1) is supplied to the first capacitor (first configuration).

As a result, after returning to the first mode (that is, after resuming the switching operation), it is possible to quickly stabilize the output voltage at a desired voltage.

In the circuit of the first configuration (see FIG. 9), the second amplifier may include an output switch (14c) connected to the second wiring, and may be configured to, in the first mode, change the second voltage by causing a current to flow through the second wiring through the output switch of the second amplifier according to the second difference, and in the second mode, cut off a current flowing between the second amplifier and the second wiring by turning off the output switch (second configuration).

This suppresses unnecessary fluctuations in the voltage of the second wiring in the second mode.

In the circuit of the second configuration, the second amplifier may be configured to, in the first mode, supply output charges to the second wiring through the output switch, or draw input charges from the second wiring through the output switch, according to the second difference, the second amplifier may include a current generation circuit (14b) configured to generate the output charges and the input charges in the first mode, the output switch may be provided between the current generation circuit and the second wiring, driving of the current generation circuit may be stopped in the second mode, and the second amplifier may be configured to activate the current generation circuit and then turn on the output switch when returning from the second mode to the first mode (third configuration).

Thus, when returning from the second mode to the first mode, it is possible to suppress input/output of charges to/from the second wiring through the output switch while the current generation circuit is in an unstable state. As a result, it is possible to quickly stabilize the output voltage at a desired voltage after returning to the first mode.

In the circuit of the third configuration (see FIGS. 10 and 11), the output switch in the second amplifier may include a source switch (SW1) and a sink switch (SW2), and the second amplifier may be configured to: in the first mode, turn on the source switch and the sink switch to supply the output charges to the second wiring through the source switch or draw the input charges from the second wiring through the sink switch, according to the second difference; turn off the source switch and the sink switch in the second mode; and activate the current generation circuit and then turn on the source switch and the sink switch when returning from the second mode to the first mode (fourth configuration).

Thus, when returning from the second mode to the first mode, it is possible to suppress input/output of charges to/from the second wiring through the source switch or the sink switch while the current generation circuit is in an unstable state. As a result, it is possible to quickly stabilize the output voltage at a desired voltage after returning to the first mode.

In the circuit of the fourth configuration (see FIG. 12), when returning from the second mode to the first mode, the second amplifier may be configured to turn on one of the source switch and the sink switch and then turn on the other of the source switch and the sink switch after activating the current generation circuit (fifth configuration).

As a result, it is possible to allow the output voltage to fluctuate as desired immediately after returning to the first mode.

In the circuit of any one of the first to fifth configurations (see FIG. 13), the first amplifier may include an output switch (11c) connected to the first wiring, and may be configured to, in the first mode, change the first voltage by causing a current to flow through the first wiring through the output switch of the first amplifier according to the first difference, and in the second mode, cut off a current flowing between the first amplifier and the first wiring by turning off the output switch (sixth configuration).

This suppresses unnecessary fluctuations in the voltage of the first wiring in the second mode.

In the circuit of the sixth configuration, the first amplifier may be configured to, in the first mode, supply output charges to the first wiring through the output switch of the first amplifier, or draw input charges from the first wiring through the output switch of the first amplifier, according to the first difference, the first amplifier may include a current generation circuit (11b) configured to generate the output charges and the input charges for the first wiring in the first mode, the output switch of the first amplifier may be provided between the current generation circuit of the first amplifier and the first wiring, driving of the current generation circuit of the first amplifier may be stopped in the second mode, and the first amplifier may be configured to activate the current generation circuit of the first amplifier and then turn on the output switch of the first amplifier when returning from the second mode to the first mode (seventh configuration).

Thus, when returning from the second mode to the first mode, it is possible to suppress input/output of charges to/from the first wiring through the output switch while the current generation circuit is in an unstable state. As a result, it is possible to quickly stabilize the output voltage at a desired voltage after returning to the first mode.

In the circuit of any one of the first to seventh configurations, the output voltage may be generated by rectifying and smoothing a voltage generated by switching the input voltage in the switching circuit (eighth configuration).

A switching power supply device according to another aspect of the present disclosure includes: the switching power supply circuit of any one of the first to eighth configurations; and a rectifying/smoothing circuit (L1 and C1) configured to generate the output voltage by rectifying and smoothing a voltage generated by switching the input voltage in the switching circuit (ninth configuration).

According to the present disclosure in some embodiments, it is possible to provide a switching power supply circuit and a switching power supply device, which contribute to stabilization of an output voltage relating to resumption of a switching operation.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switching power supply circuit used in a switching power supply device configured to generate an output voltage by switching an input voltage, comprising:
  a switching circuit configured to switch the input voltage by a switching operation;
  a first amplifier configured to generate, on a first wiring, a first voltage corresponding to a first difference between a feedback voltage corresponding to the output voltage and a reference voltage;
  a first phase compensation circuit including a first capacitor provided in series between the first wiring and a fixed potential point and configured to compensate for a phase of the first voltage;
  a second amplifier configured to generate, on a second wiring, a second voltage corresponding to a second difference between a voltage corresponding to a current flowing through the switching circuit and the first voltage;
  a second phase compensation circuit including a second capacitor provided in series between the second wiring and the fixed potential point and configured to compensate for a phase of the second voltage; and
  a drive control circuit configured to be capable of executing the switching operation according to the second voltage,
  wherein the switching power supply circuit is configured to operate in a first mode or a second mode according to the feedback voltage,
  wherein the drive control circuit is configured to, in the first mode, perform the switching operation while driving the first amplifier and the second amplifier, and in the second mode, stop the switching operation by stopping driving the first amplifier and the second amplifier, and
  wherein when returning from the second mode to the first mode, a specific voltage corresponding to the output voltage is supplied to the second capacitor and a predetermined voltage is supplied to the first capacitor.

2. The switching power supply circuit of claim 1, wherein the second amplifier includes an output switch connected to the second wiring, and
wherein the second amplifier is configured to, in the first mode, change the second voltage by causing a current to flow through the second wiring through the output switch of the second amplifier according to the second difference, and in the second mode, cut off a current flowing between the second amplifier and the second wiring by turning off the output switch.

3. The switching power supply circuit of claim 2, wherein the second amplifier is configured to, in the first mode, supply output charges to the second wiring through the output switch, or draw input charges from the second wiring through the output switch, according to the second difference,
wherein the second amplifier includes a current generation circuit configured to generate the output charges and the input charges in the first mode,
wherein the output switch is provided between the current generation circuit and the second wiring,
wherein driving of the current generation circuit is stopped in the second mode, and
wherein the second amplifier is configured to activate the current generation circuit and then turn on the output switch when returning from the second mode to the first mode.

4. The switching power supply circuit of claim 3, wherein the output switch in the second amplifier includes a source switch and a sink switch, and
wherein the second amplifier is configured to:
in the first mode, turn on the source switch and the sink switch to supply the output charges to the second wiring through the source switch or draw the input charges from the second wiring through the sink switch, according to the second difference;
turn off the source switch and the sink switch in the second mode; and
activate the current generation circuit and then turn on the source switch and the sink switch when returning from the second mode to the first mode.

5. The switching power supply circuit of claim 4, wherein when returning from the second mode to the first mode, the second amplifier is configured to turn on one of the source switch and the sink switch and then turn on the other of the source switch and the sink switch, after activating the current generation circuit.

6. The switching power supply circuit of claim 1, wherein the first amplifier includes an output switch connected to the first wiring, and
wherein the first amplifier is configured to, in the first mode, change the first voltage by causing a current to flow through the first wiring through the output switch of the first amplifier according to the first difference, and in the second mode, cut off a current flowing between the first amplifier and the first wiring by turning off the output switch.

7. The switching power supply circuit of claim 6, wherein the first amplifier is configured to, in the first mode, supply output charges to the first wiring through the output switch of the first amplifier, or draw input charges from the first wiring through the output switch of the first amplifier, according to the first difference,
wherein the first amplifier includes a current generation circuit configured to generate the output charges and the input charges for the first wiring in the first mode,
wherein the output switch of the first amplifier is provided between the current generation circuit of the first amplifier and the first wiring,
wherein driving of the current generation circuit of the first amplifier is stopped in the second mode, and
wherein the first amplifier is configured to activate the current generation circuit of the first amplifier and then turn on the output switch of the first amplifier when returning from the second mode to the first mode.

8. The switching power supply circuit of claim 1, wherein the output voltage is generated by rectifying and smoothing a voltage generated by switching the input voltage in the switching circuit.

9. A switching power supply device, comprising:
the switching power supply circuit of claim 1; and
a rectifying/smoothing circuit configured to generate the output voltage by rectifying and smoothing a voltage generated by switching the input voltage in the switching circuit.

* * * * *